(12) United States Patent
Huang et al.

(10) Patent No.: US 9,979,817 B2
(45) Date of Patent: *May 22, 2018

(54) USING AUTOMATICALLY COLLECTED DEVICE PROBLEM INFORMATION TO ROUTE AND GUIDE USERS' REQUESTS

(71) Applicant: Future Dial, Inc., Sunnyvale, CA (US)

(72) Inventors: George Huang, Los Altos Hills, CA (US); Dwight Sing Huang, Mountain View, CA (US)

(73) Assignee: FUTURE DIAL, INC., Sunnyvale, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/162,421

(22) Filed: May 23, 2016

(65) Prior Publication Data

US 2016/0269553 A1    Sep. 15, 2016

Related U.S. Application Data

(63) Continuation of application No. 13/797,327, filed on Mar. 12, 2013, now Pat. No. 9,363,367.

(Continued)

(51) Int. Cl.
*H04M 3/42* (2006.01)
*H04W 4/16* (2009.01)
(Continued)

(52) U.S. Cl.
CPC ... *H04M 3/42059* (2013.01); *H04M 3/42068* (2013.01); *H04M 3/5183* (2013.01);
(Continued)

(58) Field of Classification Search
CPC ......... H04M 3/42059; H04M 3/42068; H04M 3/5183; H04W 4/02; H04W 4/16;
(Continued)

(56) References Cited

U.S. PATENT DOCUMENTS 7,249,286 B1 * 7/2007 Krishnan ............ H04L 41/0663
714/27
2003/0147522 A1    8/2003 Elazar
(Continued)

FOREIGN PATENT DOCUMENTS

JP    2007042082    2/2007

*Primary Examiner* — Timothy Pham
(74) *Attorney, Agent, or Firm* — Greenberg Traurig, LLP

(57) ABSTRACT

A system and method for providing assistance to a customer of a computing device. In one aspect, an incoming call is received from a device of a customer; a check for identification of the customer is done; an event history of the device is obtained; and a solution is provided to the customer using the event history. In another aspect, a method includes: receiving a code from a mobile computing device; and in response to receiving the code, calculating at least one set of data for use in guiding a request of a customer for service to a resource that can provide a suggested remedy. In another aspect, a method includes: identifying a user associated with a mobile computing device; determining an event history of the mobile computing device; and providing guidance to resolve an issue based on the event history.

19 Claims, 40 Drawing Sheets

Related U.S. Application Data

(60) Provisional application No. 61/762,797, filed on Feb. 8, 2013.

(51) Int. Cl.
*H04M 3/51* (2006.01)
*H04W 4/02* (2018.01)

(52) U.S. Cl.
CPC ........... *H04M 3/5191* (2013.01); *H04W 4/16* (2013.01); *H04M 2203/551* (2013.01); *H04W 4/02* (2013.01)

(58) Field of Classification Search
CPC ..... H04W 24/06; H04W 4/003; G06F 21/568; G06F 11/00; G06F 11/0793; G06F 3/04895; H04L 41/0654
USPC ...................................................... 455/414.1
See application file for complete search history.

(56) References Cited

U.S. PATENT DOCUMENTS

| | | |
|---|---|---|
| 2003/0208593 A1* | 11/2003 | Bharati ............... G06F 11/0748 709/224 |
| 2006/0035631 A1 | 2/2006 | White et al. |
| 2006/0211415 A1 | 9/2006 | Cassett et al. |
| 2007/0011124 A1 | 1/2007 | Behdjati et al. |
| 2007/0074076 A1* | 3/2007 | Imai ..................... G06F 11/0709 714/26 |
| 2008/0016017 A1 | 1/2008 | Biazetti et al. |
| 2008/0263398 A1 | 10/2008 | Mori et al. |
| 2011/0039571 A1 | 2/2011 | Bodine et al. |
| 2011/0287763 A1 | 11/2011 | Fujimoto et al. |
| 2012/0322439 A1 | 12/2012 | Ding et al. |
| 2013/0047038 A1 | 2/2013 | Huang |
| 2013/0159989 A1 | 6/2013 | Deckert et al. |
| 2014/0228005 A1 | 8/2014 | Huang et al. |
| 2015/0100836 A1* | 4/2015 | Wang .................... G06F 11/327 714/57 |

* cited by examiner

USING AUTOMATICALLY COLLECTED DEVICE PROBLEM INFORMATION TO ROUTE AND GUIDE USERS' REQUESTS

CROSS REFERENCE TO RELATED APPLICATIONS

The present application is a continuation application of U.S. patent application Ser. No. 13/797,327, filed Mar. 12, 2013, entitled "USING AUTOMATICALLY COLLECTED DEVICE PROBLEM INFORMATION TO ROUTE AND GUIDE USERS' REQUESTS" by George Huang, et al., which itself claims priority to U.S. Provisional Application Ser. No. 61/762,797, filed Feb. 8, 2013, entitled "ENHANCED SYSTEM AND METHOD FOR USING AUTOMATICALLY COLLECTED DEVICE PROBLEM INFORMATION TO ROUTE AND GUIDE USERS' REQUESTS" by George Huang, the entire contents of which applications are incorporated by reference as if fully set forth herein.

The present application is related to U.S. Non-Provisional application Ser. No. 13/706,259, filed Dec. 5, 2012, entitled "ENHANCED SYSTEM AND METHOD FOR CUSTOM PROGRAMMING OF LARGE GROUPS OF PHONES WITHOUT REQUIRING ADDITIONAL EQUIPMENT," by Huang et al., the entire contents of which application is incorporated by reference as if fully set forth herein.

BACKGROUND

Often, transferring data in phones can be very cumbersome. In particular, modern phones may hold multiple gigabytes of data comprising pictures and other graphical representations, address records, emails, etc. A lot of overhead going through the applications creates a data bottleneck for service stations and other stores that offer such data transfer services.

FIGS. 1A and 1B show two typical telephone/PDA device data transfer stations. In FIG. 1A, transfer station 100 has a phone data transfer machine (PDTM) 110, typically a PC with USB and Bluetooth connectivity running phone data transfer applications such as PC Suite, PC Tools and other phonebook transfer applications, which typically may connect to two handsets: originating handset 101 and a receiving handset 102. Said connections are typically made via USB cables 103 or custom cables 104. Each phone has its own operating system with software 101$a$ and 102$a$, respectively, and data sets 101$b$1-$n$ and 102$b$1-$n$, respectively. This data may contain a variety of information, including, but not limited to, address book data, phone numbers, email addresses, pictures, video clips, and other types of data that may be used by cell phones and their applications. In some cases even the applications installed on the phone and/or the application data may be transferable. Typically, machine 110 would have its own operating system 110$a$, which has multiple programs 110$b$. Often, machine 110 with operating system 110$a$ and programs 110$b$ is actually a custom, dedicated PC, and as such it has to contain drivers or DLLs 110$c$ for all the phones to which it may be connected. As a result of having a large library of DLLs (or drivers, used interchangeably here) almost any data transfers between two different phones can work. The machine can, by using the DLLs, communicate and download the data objects (each item typically comes down as one or more data objects from the phone), which are then stored in machine 110 temporarily and eventually sent on to the other phone, as its data objects, using the matching DLL. Each of these devices has a CPU and memory, both volatile and nonvolatile, and thus each forms a small, distinct computing device.

FIG. 1B shows another type of known data transfer station 120. Copy machine 121 has only one connector. It is first plugged into the originating machine 101, using connection 105, via which connection the data is transferred into machine 121. Then the receiving device 102 is connected by a cable connection 106 (dotted) in a second step, and that connection is used to transfer the data from machine 121 to phone 102. Again, these devices have operating systems, programs, and DLLs, as described above in the discussion of FIG. 1A.

A large cost is inflicted on cellular network operators by the user practice of returning devices for repair or exchange that are not actually defective. There are several reasons for this problem: some operating intermittencies may not be caught during in store testing of a defective device, or the problem may be caused by peripheral devices that are not returned with the supposedly faulty phone. A large portion of the problem may be attributed to user configuration errors, network configuration errors, or user software add-ons that are installable in the phone but may not be completely compatible with the particular phone set up and its particular network. Only a small fraction of returns are due to actual failure of the hardware. However, efficient and expedient repair of handsets is very important, because the cost of each handset repair affects the final profitability of an operator. One of the most important aspects of handset repair is efficiently achieving a specific level of program and data sets in a repaired handset.

In some cases, more thorough diagnostics of devices with problems are needed than the diagnostics that are available currently. These diagnostics should not merely rely on internal functional diagnostics, but they should also include hardware configuration diagnostics, program configuration diagnostics, and network configuration diagnostics; and they should also look for other factors, including but not limited to program compatibility issues.

Often, the exchange of data objects between different phones is desired or required. Some phones do not support such a feature; other phones have a very limited ability in this regard. For example, such phones may allow exchange of an object such as a business card, but do not support exchange of photos, videos or other larger graphic images.

In some cases wired telephone connections may be difficult or impossible due to defective connectors, unavailable infrastructure, etc.

Some telephone devices are notoriously difficult to access with an in-store diagnostic device, be it wirelessly or via wired connection. In the context of universal serial bus (USB) devices, the manufacturers are supposed to use vendor ID (VID) and product ID (PID) numbers to distinctly identify every product.

These VID/PID numbers are often also used in other connectivity schemes, including but not limited to Bluetooth (BT), local area network (LAN) and over the Internet. These access problems occur due to various legitimate or not-so-legitimate reasons, and more frequently, device manufacturers either re-use the same VID/PID numbers for different devices to save money on registration fees, or in other cases, a fly-by-night garage-style manufacturer clandestinely produces a series of few hundred or a few thousand devices and then closes up shop. This is often because such phones infringe copyrights or other intellectual property, pretending to be brand-name manufacturers' phones, but using different components, such as chips. Despite these problems, it is sometimes desirable for an operator, such as, for example, an independent store operator, to provide service nevertheless, doing so to maintain good customer relations, rather than to rebuff or annoy a customer.

In many cases, it is desirable to back up the data on a mobile communication device with a back-up device that does not require a connection to a standard computer, such as, for example, the exemplary computer of FIG. 7. For example, when a person with a mobile communication device is traveling away from the office, sometimes it is necessary or desirable to travel without a computing device such as a laptop computer; however, a person may still need to back up the data in his or her mobile communication device.

SUMMARY

In one embodiment, a computer-implemented system and method include receiving, by a server computer, a code from the mobile computing device over a wired or wireless data connection. In response to the receiving of the code, the server computer transmits to the mobile computing device over the data connection a software module. The software module is for execution on the mobile computing device and for installing software on the mobile computing device in response to the execution.

In one embodiment, the mobile computing device includes multiple mobile computing devices. The receiving of the code can include establishing the data connection. The establishing of the (e.g., wireless) data connection can include associating the server computer to an activation unstructured supplementary services data number associated with the mobile computing device and/or associating the server computer to an activation telephone number associated with the mobile computing device.

In one embodiment, the receiving of the code includes receiving one or more of an enterprise customer identifier, a user identifier, and a password. The transmitting of the software module can include transmitting one or more of an image and software for setup of the mobile computing device. The transmitting of the software module for execution on the mobile computing device and for installing software may further include transmitting the software module to overwrite memory of the mobile computing device during the execution and/or transmitting for storage on the mobile computing device individualized credentials. The individualized credentials may be one or more of a user password, user account information, user email setup, user control information, internal extensions for the user, WiFi settings, passwords, Bluetooth settings, user contacts, etc. In one embodiment, the software module is associated with the user.

In one embodiment, a system comprises: at least one processor; and memory storing instructions configured to instruct at least one processor to: receive an incoming call from a device of a customer; check for an identification of the customer; obtain, from a data repository, an event history of the device; and facilitate providing a solution to the customer using the event history.

In another embodiment, a method includes: receiving, by a server computer, a code from a mobile computing device of a user, wherein the code is received over a wireless data connection before activation of the mobile computing device; and in response to receiving the code, calculating, by the server computer, at least one set of data for use in guiding a request of a customer for service to a resource that can provide a suggested remedy.

In yet another embodiment, a non-transitory computer readable storage medium, stores computer program instructions capable of being executed by a computer processor, the computer program instructions defining: identifying, by a server computer, a user associated with a mobile computing device before the user activates the mobile computing device; determining, by the server computer, an event history of the mobile computing device; and providing, to the user, guidance to resolve an issue associated with the mobile computing device based on the event history.

DETAILED DESCRIPTION

Figure 1B:
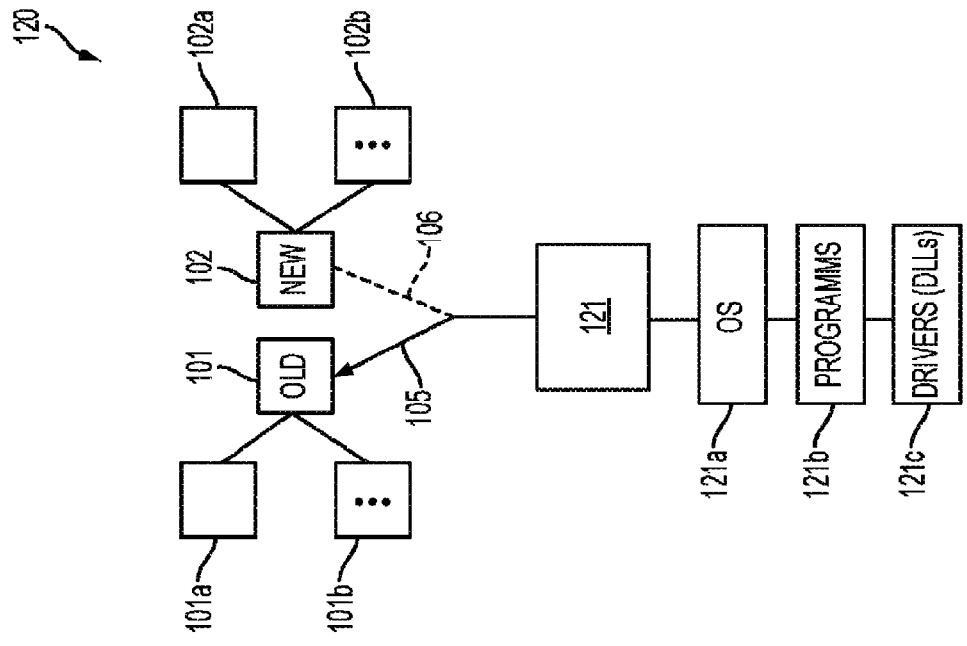
FIGS. 1A and 1B show an exemplary conventional telephone/PDA device data transfer station.
Figure 1A:
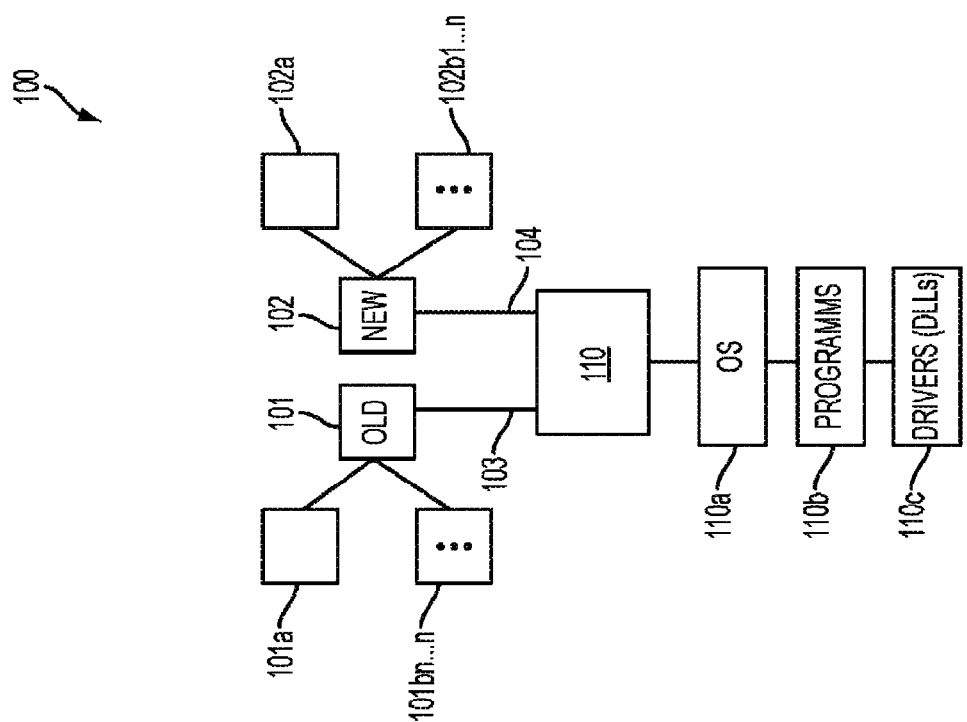

What is needed in some embodiments is a system and method for tracking and detecting device failures, and by doing so analyzing the problems and detecting the incorrect return of hardware, thus reducing dramatically the overall cost of network operations.

Additionally needed in some embodiments is an enhanced system and method to collect information about faults and problems mostly created by misbehaving or malicious applications. However, any problems between applications and operating system, driver, hardware, other apps, or any combination thereof due to software incompatibilities of hardware or of software installed in said mobile computing device can be observed and recorded. Also needed in some embodiments is an enhanced system and method that not only takes into account statistical data collected from software recording, but further adds information gleaned from social networking sites, technical forum sites, any database with pertinent information on device issues and solutions, etc., relevant to the specific models of mobile communication devices.

What is further needed in some embodiments is a system and method that allows data transfer between phones without requiring PDTMs such as 110 or 121, thus allowing the user to transfer data at his own pace and, if multiple transfers must be done, they can be done concurrently, because limited resources, such as copy machine 110 or 121, are generally not required.

Further, it is desired, that such a system operates cross-platform. For example currently, a Palm device can beam to another Palm device and a Nokia device can beam to another Nokia device, but currently a Palm device cannot beam to a Nokia device and vice versa, or to phones manufactured by any other manufacturer, by in large. Some exceptions exist within limited groups of some devices by different manufacturers that use same operating systems.

What is further needed in some embodiments is a system and method that, using a small, portable device such as a USB key, can create backups directly from mobile communication and personal computing devices.

What is additionally needed in some embodiments is a system and method for tracking and detecting device failures, and by doing so analyzing the problems and detecting the incorrect return of hardware, thus reducing dramatically the overall cost of network operations.

In most cases, manufacturers need to preload client software to at least one if not both devices for a beaming operation to work. In an embodiment, the present disclosure does not require client software to be pre-installed. In this respect, the device containing the "old" data can be communicated with as if a computer is communicating with the device. This functionality is generally supported on the mobile phone devices, even on older models, in their stock configuration without additional special purpose applications being installed. In an embodiment, the "old" phone is interfaced with using stock interfaces already on the phone, for example by an application installable on a PC that allows the PC to read from devices through a USB cable without first having to pre-install a client. Further, the wireless technology used by the device does not matter, as it can read can read from both CDMA and GSM phones, like the PC based tool.

Figure 2:
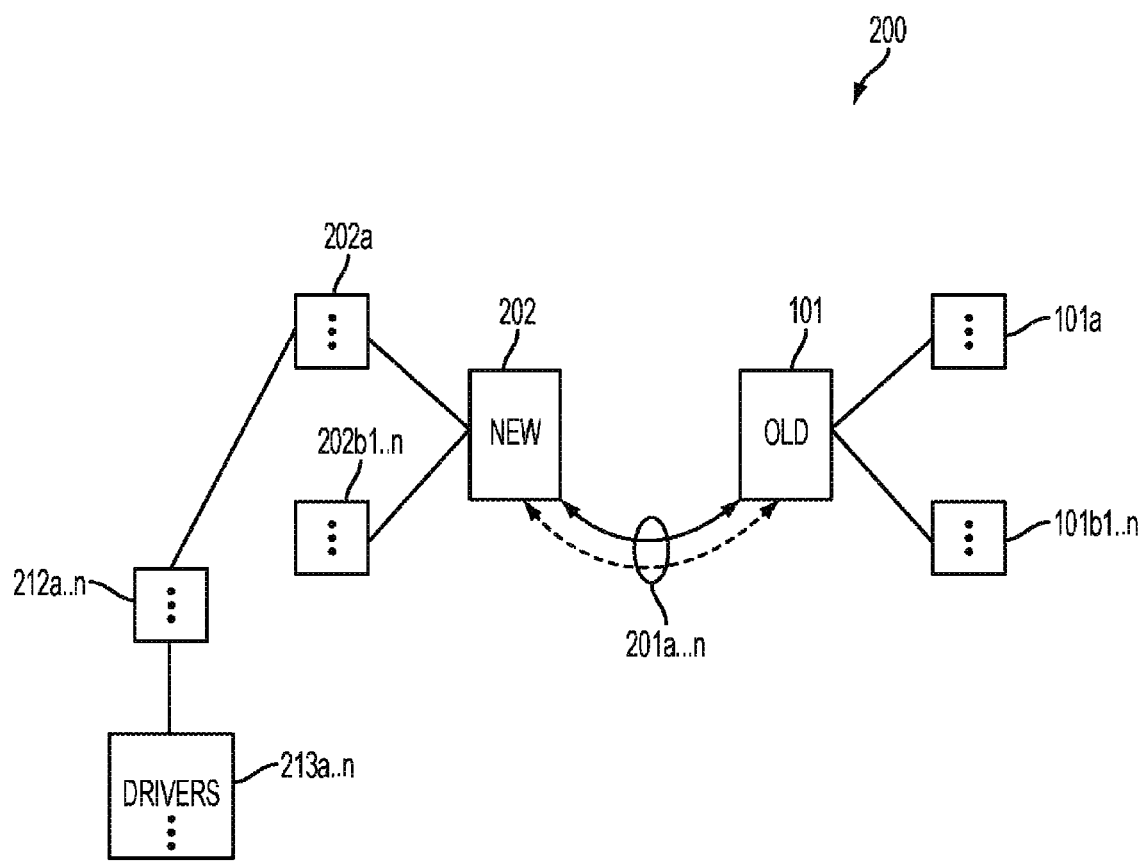
FIG. 2 an example of a typical telephone/personal data assistant ("PDA") device data transfer station which can be utilized with the system and method according to the disclosed subject matter.

FIG. 2 shows an example of a system 200 according to one embodiment of this disclosure. In this example, the receiving phone 202 may be connected, either by wired or wireless connection, to the originating phone 101, as indicated by connection lines 201a-n. This connection could be via Wi-Fi ad hoc connection, Bluetooth connection, wired connection, or in some embodiments an over-the-air network connection. In an embodiment, the originating phone 101 has, as before, an operating system 101a and a data set 101b1-n. The receiving phone 202 has the same software; however, additionally, the operating system 202a contains applications 212a-n, at least one of which (referred to herein as 212x, not shown) is the copying software. This software may be, for example, downloaded from a network provider and installed in the phone or, in some embodiments, pre-installed in the phone by the manufacturer. More than one type of copying software may be required, depending on the various different phones involved in a transfer, but requiring only one application for a given new phone. Copying software 212x has access to a complete set of drivers and DLLs 213a-n, which drivers and DLLs may be required for various different phones. The complete library of drivers and DLLs may be pre-installed in the originating phone and updated through the Internet. In some embodiments, these drivers and DLLs 213a-n may not be downloaded until phones 202 and 101 are paired, so that only the driver(s) and DLL(s) for the specific paired devices are downloaded. In other embodiments, some or all available drivers and DLLs may be downloaded, but some or all drivers and DLLs may be removed later to free up memory in the receiving device 202. As previously mentioned, devices such as phone 202, and optionally phone 101, are generally known as smart phone computing devices or other mobile Internet/computing devices, including, but not limited to, smart phones, tablets, etc. Typically these devices have a very powerful CPU, a relatively large amount of memory of different kinds (including but not limited to RAM, flash, removable media, etc.), input devices, display devices, speaker, microphone, and other such components and a software operating system 202a, so that they are actually fully functional, hand-held computing platforms, with functionality limited only by their size and sometimes by restrictions of their operating system 202a. In some embodiments, the copy software and adapted or simulated DLLs may be adapted to run on the phone's operating system ("OS"), and in other embodiments an additional OS that runs within a protected environment (similar to a virtual machine) but allows use of unmodified DLLs may be provided.

Figure 3:
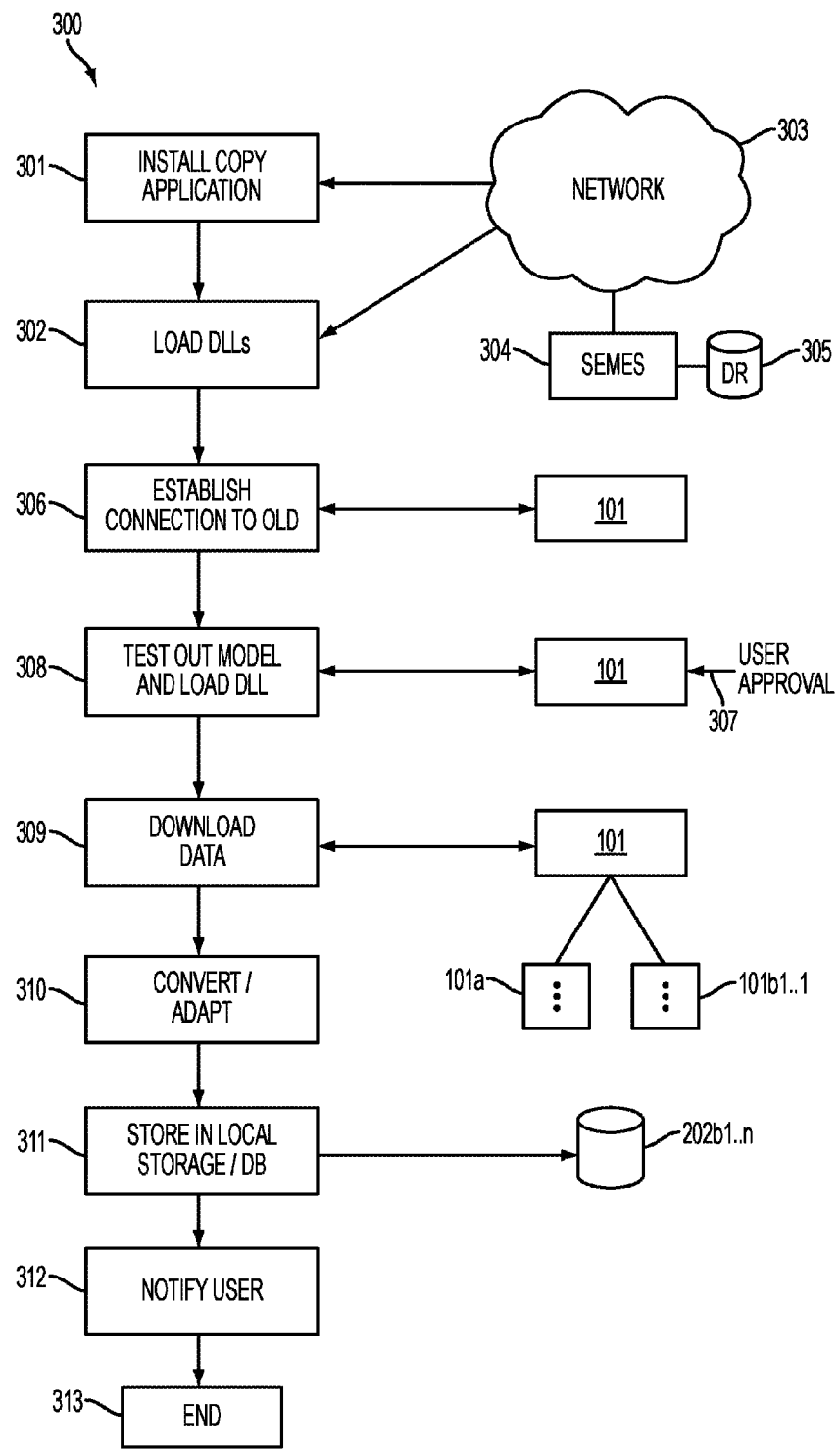
FIG. 3 shows an exemplary process for data transfer.

FIG. 3 shows an exemplary process 300 for data transfer according to one embodiment of the disclosed system. In step 301 the copy application is downloaded into a receiving phone such as phone 202. In this example, the download is via network 303 from data repository 305 that resides in server 304 and that contains copy applications for all supported phones. In step 302, DLLs are loaded into device 202, also from data repository 305 in server 304. As mentioned previously, this step may occur only after connection with an originating phone such as phone 101 is established. In step 306, the connection is established with originating phone 101. As previously described, this connection may be made via any of various types of connectivity means that are currently known in the art or that may in the future be developed and made publicly available. In all cases, the connection process would involve a confirmation or pass code, such as the process currently used for the connection of Bluetooth devices. In some cases, this connection would actually be between two Bluetooth devices, but in other cases a similar process could be emulated via the phone number and passwords over the network or over a physical wire. In step 308 the system tests the originating device 101 to determine its specific model. This testing typically requires some user approval 307 or a user action on the originating phone, either of which may also act as a privacy protection (sometimes it may be part of communication protocols, such as pairing of Bluetooth devices. etc.). Then typically the DLL 213x for that specific model is loaded for use by the copying software 212x. This DLL could be loaded from the library downloaded in step 302, or it could be requested from the data repository 305 via over-the-air network or other suitable connections. In step 309, the system downloads data from device 101. To the internal intelligence (software and firmware) of device 101, this process appears to occur just as if the device were connected to a computer. In step 310 the system then converts or adapts the downloaded data objects to the requirements of the receiving phone 202 by means of another DLL, which essentially mimics the process of the download to internal database 202b1-n. In step 311 the data is then downloaded into database 202b1-n. In step 312 the user is notified that the data download is complete, and in step 313 the process ends. Progress of the various procedures may be displayed to the user via progress bars on the display device of the receiving phone, showing the progress as a percentage of the overall process or as a percentage of a typical process. Such a progress display is commonly used and well known in computing devices.

Figure 4:
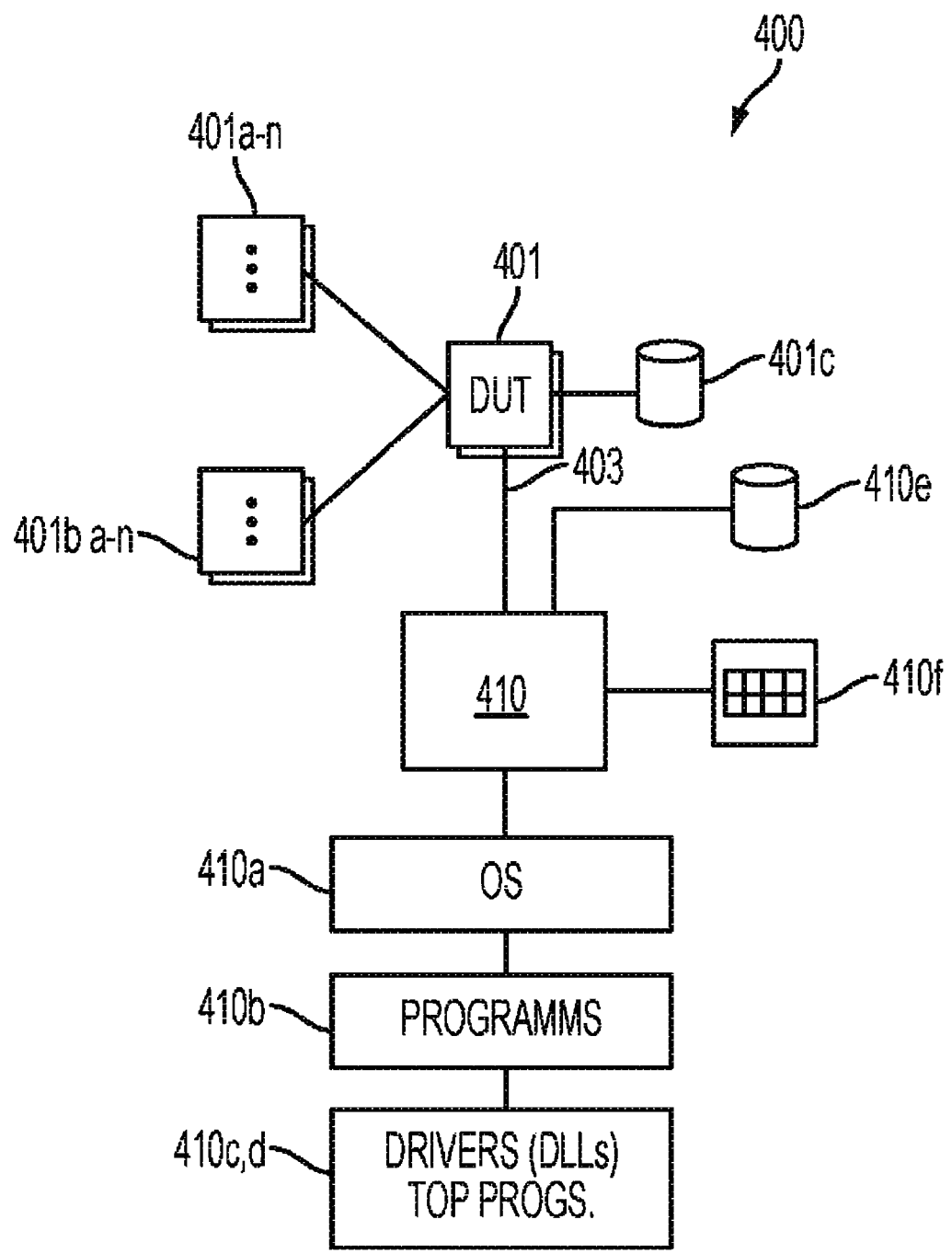
FIG. 4 shows an overview of an exemplary transfer station.

FIG. 4 shows an overview of an exemplary station 400 similar to typical telephone/PDA device data transfer stations as are currently in use. In FIG. 4, phone data transfer machine (PDTM) 410 is typically a PC or other suitable computing device with USB and Bluetooth connectivity running phone data transfer applications such as PC Suite, PC Tools and other phonebook transfer applications, which typically may connect one or two handsets, such as the handset of a device under test (DUT) 401 as shown in FIG. 4. Said connections are typically made via USB cables 403 or custom cables 404 (not shown). Each phone has its own operating system with software 401a and data sets 401b1-n. This data may contain all kinds of information, including, but not limited to, address book data, phone numbers, email addresses, pictures, video clips, and other types of data that may be used by cell phones and their applications. In some cases even the applications or the application data may be transferable. Typically machine 410 would have its own operating system 410a, which has multiple programs 410b, including a test application 410b1 (not shown separately). Often machine 410 with operating system 410a and programs 410b is actually a custom, dedicated PC, and as such it has to contain drivers or DLLs 410c for all the phones to which it may be connected. As a result of having a large library of DLLs (or drivers, used interchangeably here) almost any data transfers between two different phones can work. The machine can, by using the DLLs, communicate and download the data objects (each item typically comes down as one or more data objects from the phone), which are then stored in machine 410 temporarily and eventually sent on to the other phone, as its data objects, using the matching DLL. It is clear that each of these devices has a CPU and memory, both volatile and nonvolatile, and thus each forms a small, distinct computing device.

Figure 5:
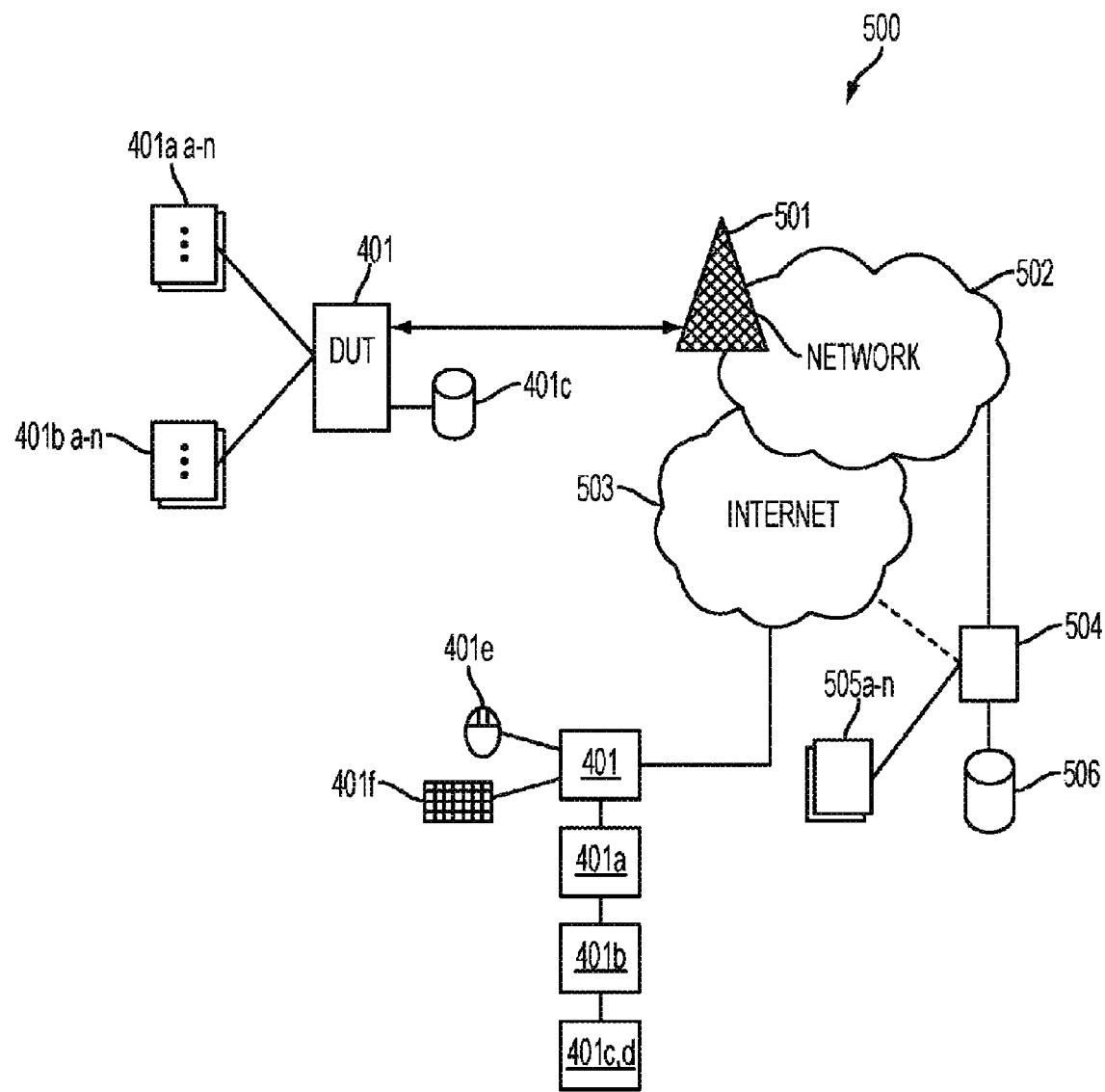
FIG. 5 shows a simplified overview of an exemplary testing system.

FIG. 5 shows a simplified overview of an exemplary testing system 500, using the same DUT 401, according to one aspect. Here, rather than being connected to a hardware testing device, a test application 410b1 (not shown separately) may, for example, be downloaded over the network 502 from a server 504, or from its data repository 506, or by some other means. In some cases the PDTM 410 may tell the server 504 which device, identified by its ESN, IMEI, phone number, etc., should receive the application, as the network operator has the ability to send special system messages to remotely install software on devices.

Figure 6:
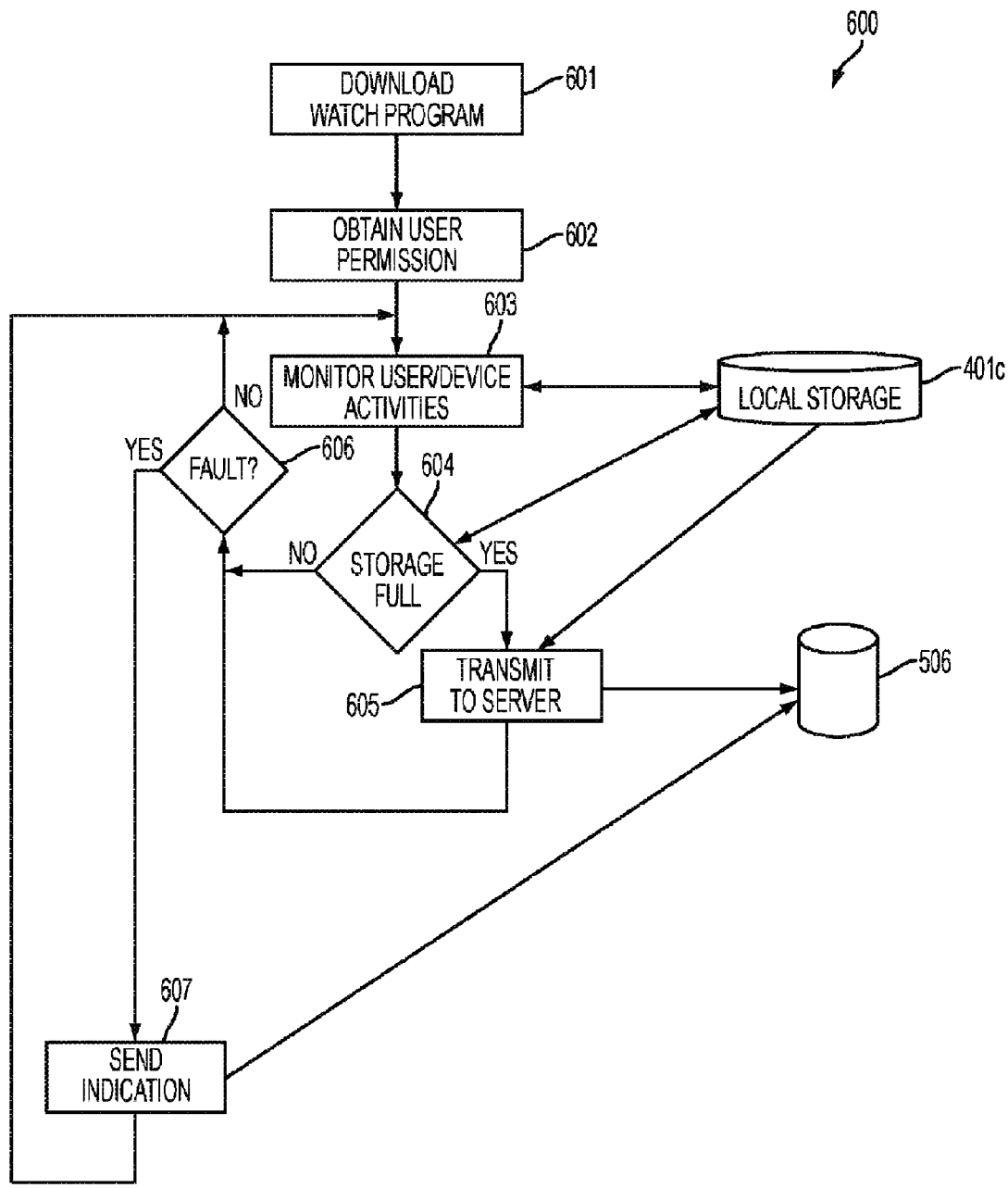
FIG. 6 shows an exemplary process for implementation of system test software.

FIG. 6 shows an exemplary process 600 for implementation of the system test software. In step 601 the system downloads a monitoring application onto a target device. In step 602, the system obtains user permission to run the application. In addition to asking a simple Yes or No question, the system may require the user to enter a password, such an account password or the user password for this device, to verify that this is not an illegal attempt to install software on the device.

In step 603, the program starts to monitor user and device activities, including but not limited to such as cell changes, roaming table updates, installation and activation of software applications, installation and activation of plug-in software, phone calls, etc. Other monitored data includes a preferred roaming list (PRL), battery operation, temperature control, logging of RF signal in and out during various operations, etc. In some cases, it is also possible to obtain a precrash memory dump, which may be stored in the local storage 401c of device 401. Local storage 401c may be, for example, a segregated section of nonvolatile memory in the device, which would preferably survive a crash without losing data.

The monitoring application preferably repetitively writes a list of applications that were launched or installed to flash memory of the device in multiple consecutively written files. In an embodiment, the monitoring application repetitively writes the list of applications to three or more consecutively written files in the flash memory in the following manner. A first file is opened, data is written to the file, and the first file is closed. A second file is then opened, data is written to the file, and the file is closed. A third or more files are then opened, data is written to these subsequent files, and the files are closed. The process is then repeated, with the first file being opened, data written to it, the first file closed, and so on. If multiple files are used in this manner in an ongoing monitoring process, then it is much more likely that at least one of the files will be readable and not corrupted after an event such as when the user pulls the battery, when the user performs a hard reset, or the when the device crashes. Furthermore, a snapshot of the state of the device can be reconstructed from a combination of two or more of the multiple files after such event even if one of the files is corrupted by the event. In an embodiment, the monitoring application is configured to selectively upload the data files to a central data repository only when a Wi-Fi connection is available to the device so as not to incur data usage charges. This mode of operation is particularly useful where the user of the device does not have an unlimited data plan, and pays per-megabyte or per-gigabyte charges for data usage.

Also, in step 604 the system monitors the remaining capacity of local storage 401c. When the storage 401c reaches a preset threshold of occupied space (yes), it is considered full and the process moves to step 605, where the system now sends data to data repository 506 on server 504, from where it can be analyzed either automatically or on demand when a customer comes to a store or repair depot to complain about the phone. From step 605 or, if the local storage is not yet full (no), from step 604, the process moves to step 606. There, the system analyzes the data transmitted by the downloaded application and stored either in local storage 401c or data repository 506. If the system does not detect a fault, the process loops back to step 603, where the system continues to monitor the device. If the system detects a fault or other relevant state or event (yes), the process moves to step 607, where the system sends a fault indication to data repository 506 of server 504. Server 504 may be running programs to respond to the fault indication by, for example, sending an email to the user of device 401 explaining the problem. A copy of this email may also be sent to the phone number's account log at the network operator's system, or, in other cases, only to the network operator's system. After the email is sent, the process loops back to step 603, where the system continues to monitor the device. By anonymizing certain data, abuses of the data may be reduced. Also, server 504 may keep a log of who has access to the phone data, who uses the data, and how it is used. These measures may reduce the incidence of unauthorized employee snooping into the phone usage of certain customers. Further, statistical and multivariate analysis may be used to extract useful information, such as the fact(s) that visiting some web-sites, or installing and respectively running some software alone or in combinations, may cause instability. That information can be mined, and also used to alert users, for example by email, SMS or other suitable means, that after installation of a certain applications, for example, their phone may become unstable etc. Also, locations of unusually high frequency of dropped calls may be discovered, and countermeasures may be used, including but not limited to alerting the user that a femtocell at his home may help him avoid those dropped calls, or installing an auxiliary cell in a bend or hollow may solve the problems for cars driving through that location. In yet other cases, end of life of battery, or programs that drain batteries may be found and users alerted either obtain a new battery or turn off power hogging software. This allows the system to do some pre-emptive troubleshooting, reducing costs and making customers more satisfied with the service offerings.

Figure 7:
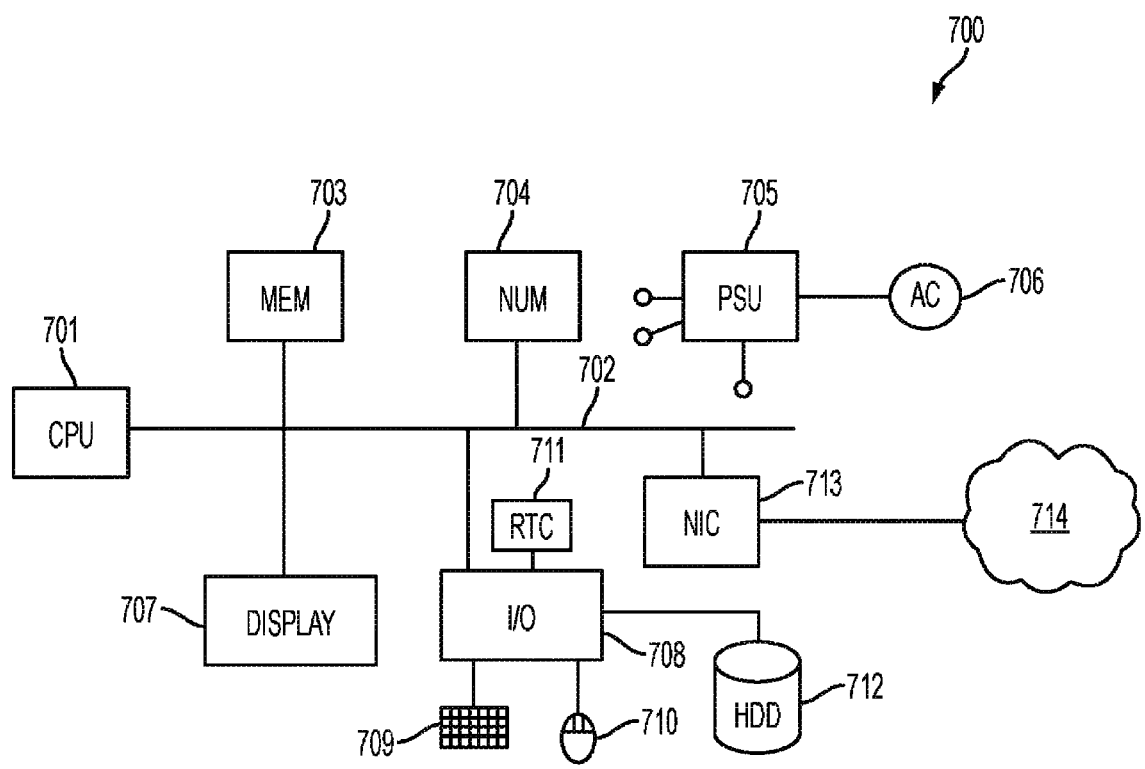
FIG. 7 shows an exemplary overview of a computer system as may be used in any of the various locations throughout disclosed system.

FIG. 7 shows an exemplary overview of a computer system 700 as may be used in any of the various locations throughout system 400. It is exemplary of any computer that may execute code to process data. Various modifications and changes may be made to the computer system 700 without departing from the broader spirit and scope of the current invention. CPU 701 is connected to bus 702, to which bus is also connected memory 703, nonvolatile memory 704, display 707, I/O unit 708, and network interface card (NIC) 713. I/O unit 708 may, typically, be connected to keyboard 709, pointing device 710, hard disk 712, and real-time clock 711. NIC 713 connects to network 714, which may be the Internet or a local network, which local network may or may not have connections to the Internet. Also shown as part of system 700 is power supply unit 705 connected, in this example, to ac supply 706. Not shown are batteries that could be present, and many other devices and modifications that are well known but are not applicable to the specific cases discussed herein.

Figure 8:
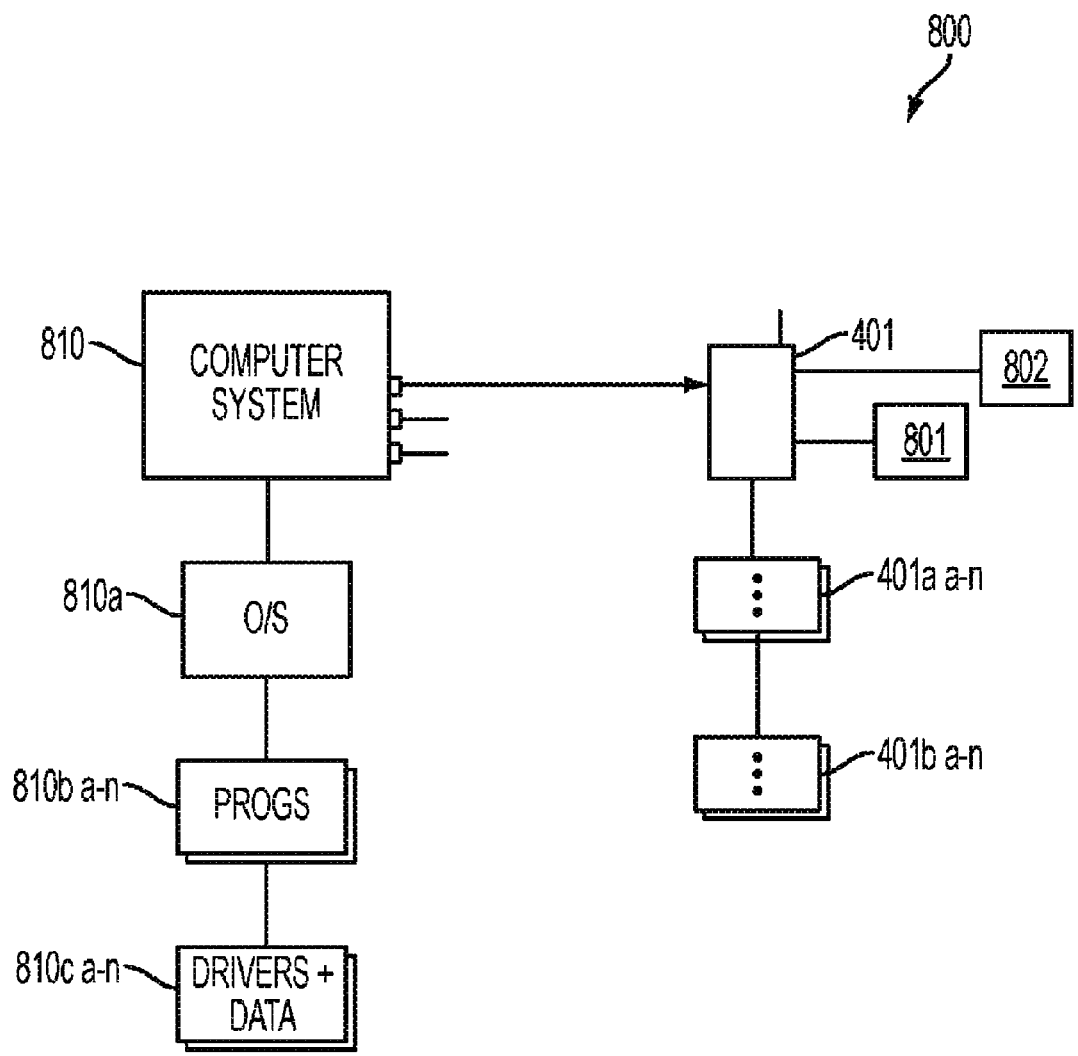
FIG. 8 shows a more detailed overview of an exemplary system similar to typical telephone/PDA device data transfer stations.

FIG. 8 shows a more detailed overview of an exemplary system 800 similar to typical telephone/PDA device data transfer stations as are currently in use and are known to the inventor. In FIG. 8, testing computer 810 is typically a PC with USB and Bluetooth connectivity running phone data transfer applications such as PC Suite, PC Tools and other phonebook transfer applications, which typically may connect one or two handsets, such as the handset of a device under test (DUT) 801 as shown in FIG. 8. These connections are typically made via USB cables 803 (not shown) or custom cables 804 (not shown). Each phone has its own operating system with software 801a and data sets 801b1-n. This data may contain various types of information, including, but not limited to, address book data, phone numbers, email addresses, pictures, video clips, and other types of data that may be used by cell phones and their applications. In some cases even the applications or the application data may be transferable. Typically machine 810 would have its own operating system 810a, which has multiple programs 810b, including a test application 810b1 (not shown separately). Often machine 810 with operating system 810a and programs 810b is actually a custom, dedicated PC, and as such it has to contain drivers or DLLs, data tables, and configuration data 810ca-n for all the phones to which it may be connected. These data tables and configuration data also contain any known combination of programs and drivers, comprising combinations that are known to be functional, as well as the ones that are known to have problems. Thus the table can indicate the existence of problems. Further, enhanced test functionality is created by downloading an additional diagnostic program 802 that supports additional manipulation and tests beyond factory diagnostic program 801 in the device 401 under test. As a result of having a large library of DLLs (or drivers, used interchangeably here) almost any data transfers between two different phones can work. The machine can, by using the DLLs, communicate and download the data objects (each item typically comes down as one or more data objects from the phone), which are then stored in machine 810 temporarily and eventually sent on to the other phone, as its data objects, using the matching DLL. It is clear that each of these devices has a CPU and memory, both volatile and nonvolatile, and thus each forms a small, distinct computing device.

Figure 9:
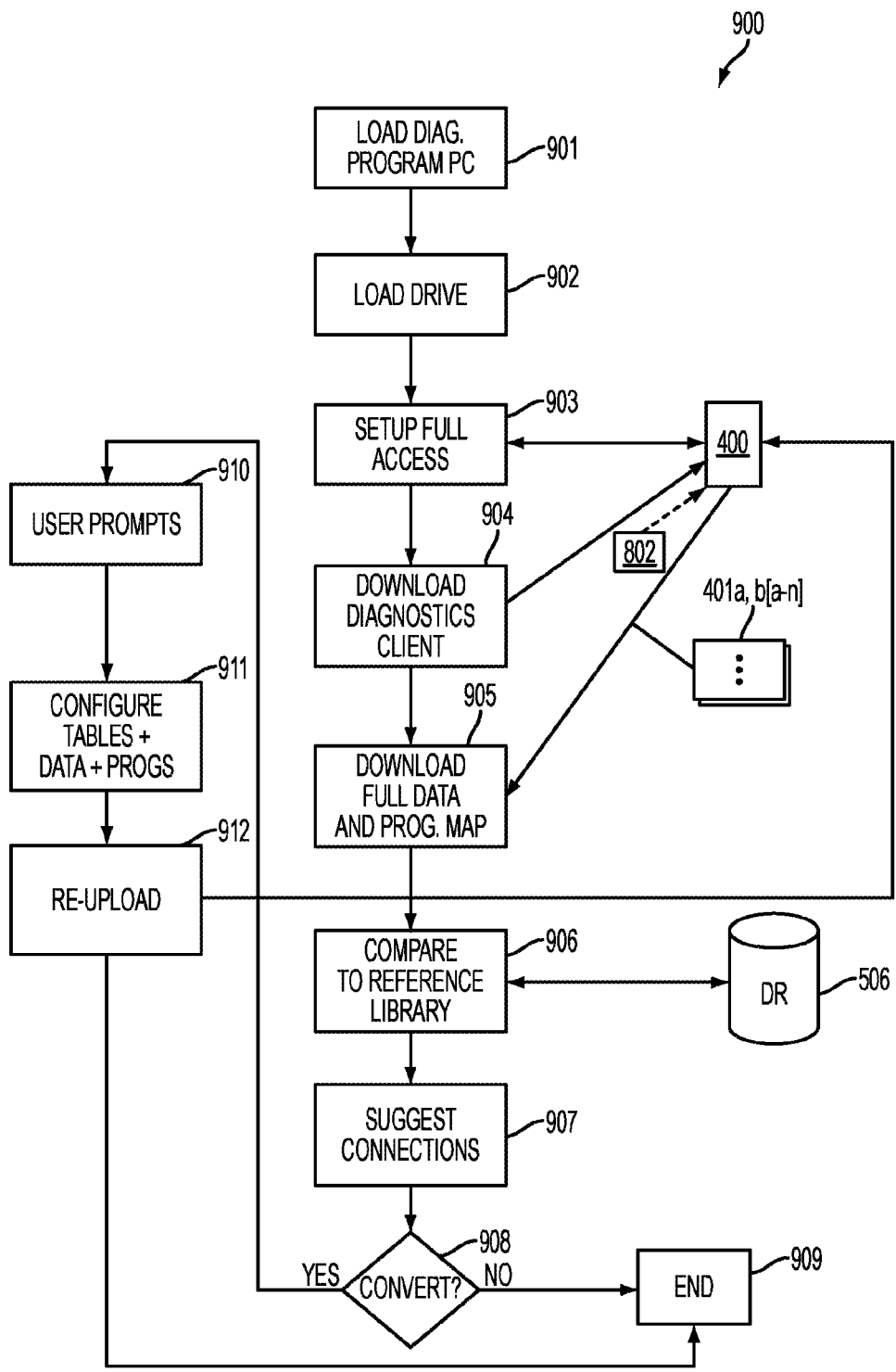
FIG. 9 shows an exemplary process for implementation of enhanced system test software.

FIG. 9 shows an exemplary process 900 for implementation of the additional enhanced system test software. In step 901 the diagnostic program is loaded into a PC, such as PC 810. In step 902 the driver for device under test is loaded, allowing connection between test computer 810 and DUT 401. In step 903 full access to DUT 401 is set up. In step 904 the enhanced diagnostics 802 are downloaded into DUT 401, which diagnostics permit access to data not normally available through previously known access methods for any of various reasons, including but not limited to security restrictions. In step 905 the full data and program map is downloaded into PC 801 from DUT 401. In step 906 the downloaded data is compared to a reference library that may reside in data repository 506 on server 504, or it may be downloaded from a source via the Internet, or via a local intranet. This comparison shows which data from device 401 may be good and which data may have problems. In step 907 results of the comparison of step 906 are flagged with suggested corrections, such as, for example, removing certain programs, or updating or modifying certain configurations, or updating certain of the software or firmware of device 401 to ensure that the configuration of device 110 is functionally compliant with the most recent data stored in the data repository. In step 908, the system may offer an option of automatic reconfiguration. If the option is not offered or not accepted (no), the process moves to step 909, where it ends. If the option is offered and accepted (yes), the process moves to step 910, where the person executing the implementation of the system (process 900) is prompted on a per-item basis to accept updates and modifications. This manual, per-item selection of modifications is necessary because some modifications may cause loss of data and/or applications, which the user may be unwilling to endure. In step 911, the accepted modifications are executed, including configuring data, programs, and tables per user options. In step 912 the modified material is uploaded into DUT 401. Upon completing the uploading, the process moves to step 909, where it ends. These diagnostics with data table comparison capabilities may also have a reminder ("nag") function that prompts the user to load updates that were not accepted in step 910. For example, a user may have been in a situation, such as a business trip, where he did not trust the connection, or the security, or he did not have time, or for some other reason he preferred to wait until a more convenient time and place. The system may also require an account password or other security mechanism to prevent unauthorized people from changing the DUT configuration. Logs of the functions may be transmitted to a server in the network operation center, allowing review of all past transactions by any technician who is attempting to assist the customer. Additional functionality that may be provided include features such as radio tagging, field strength and GPS tracking, or other add-ons.

It is clear that many modifications and variations of this embodiment may be made by one skilled in the art without departing from the spirit of the novel art of this disclosure. These modifications and variations do not depart from the broader spirit and scope of the invention, and the examples cited here are to be regarded in an illustrative rather than a restrictive sense. For example, the application for determining if a mobile phone device is defective can be loaded onto the device from another computing device either in the store or over the network. Such application analyzes for problems in at least one of hardware, software and configuration.

Further, in some cases, such application may be downloaded from a computing device connected with a cable or a local area wireless connection. In other cases, it may be downloaded over the wireless wide area communication network, even at the service location, or anywhere else. In some embodiments, the application continues to run after the local test, and then subsequently transmits information about key events to a server on the communication network. In some embodiments, the application will request a user password to verify the user wishes to have it installed, and is the authorized user of the device. In some embodiments, the data transmitted reflects or describes at least one of the following types of events: crashes of the device, other application crashes or hang-ups, loss of signal, location, loss of battery power, loss of connection, user configuration changes, user application installation and removals, data synchronization, inserting or removing data cards. Such events are time stamped, and in case of a subsequent crash, the event log can be transmitted after the mobile device regains functionality.

What is needed is a system and method that allows the exchange of any kind of object between two phones, whether exchange is originally supported by these phones or not, in a secure and safe manner. Such an exchange may be accomplished, for example, over Bluetooth, infrared, or other connection types that are well known. As discussed above, the ability to insert diagnostic tools into a phone, and more specifically, the ability to insert software into a phone, is known to the inventors.

Figure 10:
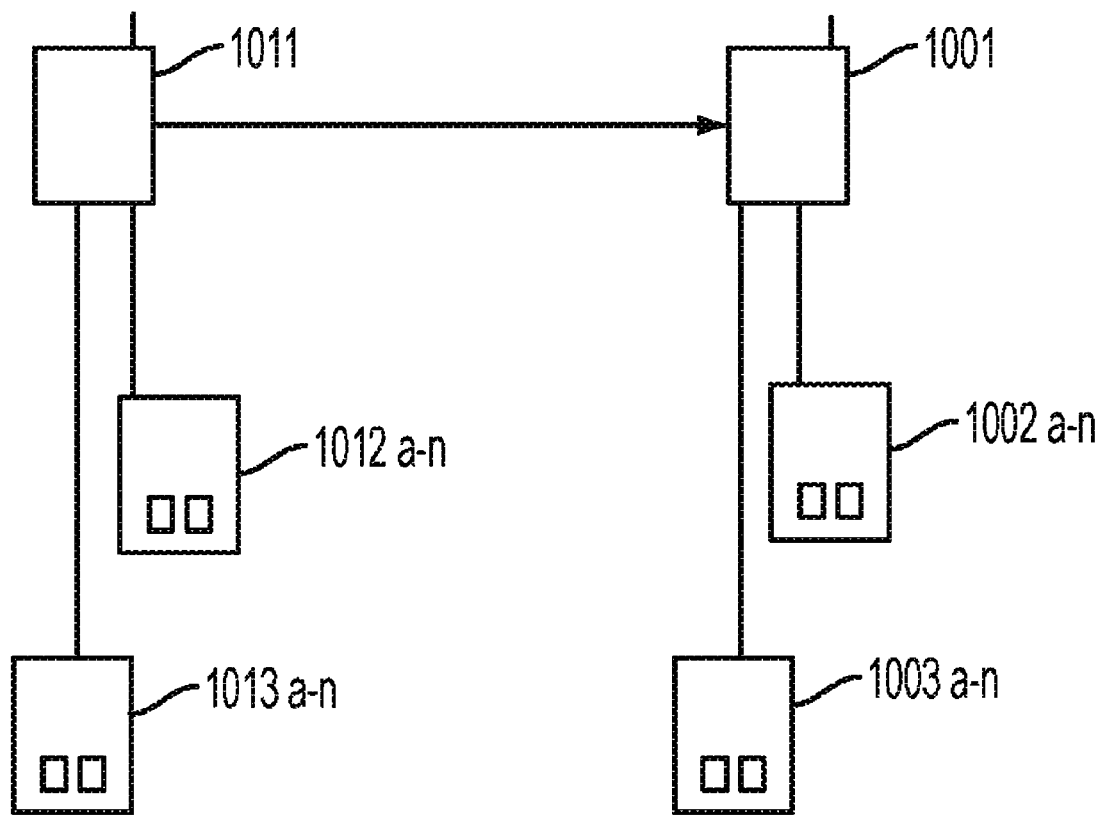
FIG. 10 shows a simplified overview of two phones that are communicating with each other, according to one embodiment of the disclosed system.

FIG. 10 shows a simplified overview of two phones, 1001 and 1011, that are communicating with each other, according to one embodiment of the current invention. Each phone 1001 and 1011 has its own store 1002*a-n* and 1012*a-n*, respectively, of software, such as, for example, programs. Similarly, each phone 1001 and 1011 has a set of data objects 1003*a-n* and 1013*a-n*, respectively. In the manner described above, the phone that is initiating communication, in this case phone 1011, is sending a diagnostic program, which in this example is a file plan for a utility, to phone 1001.

Figure 11:
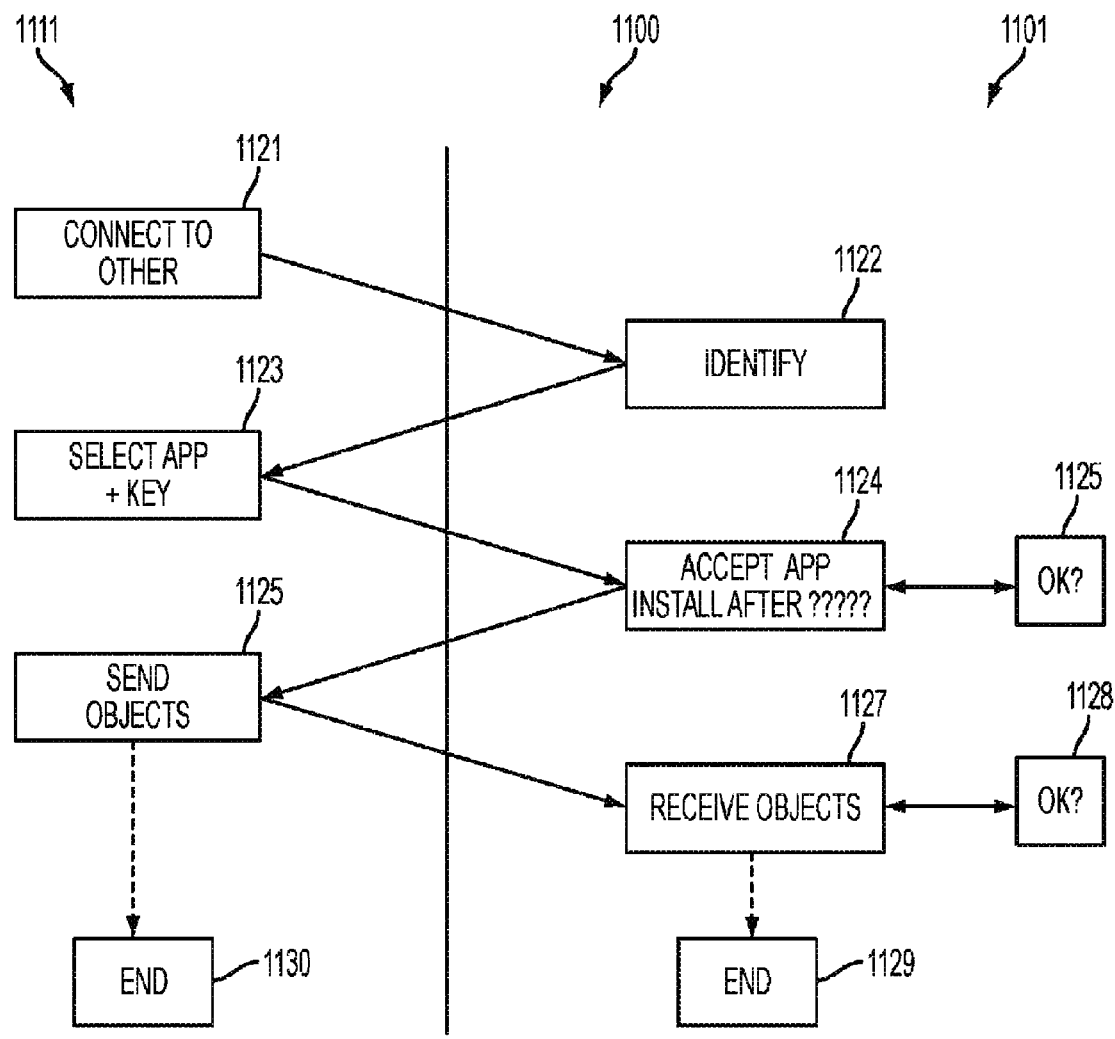
FIG. 11 shows an exemplary process of the interaction between the two phones according to one embodiment of the disclosed system.

FIG. 11 shows an exemplary process 1100 of the interaction between the two phones, according to one embodiment of the current invention. The two communication streams are stream 1111 (for phone 1011) and stream 1101 (for phone 1001). In step 1121, the initializing phone (in this example, phone 1012) connects to the other phone (in this example, phone 1001). In step 1122, phone 1001 identifies phone 1011. In step 1123, based on the identification, an application that is suitable for the object phone 1001 is taken from the application store, which forms part of the program store 1012, and is transferred to phone 1001. Typically, the phone's security system asks the user to confirm this transfer, and upon acceptance, in step 1124, phone 1001 accepts and installs the application. That application may contain a key that sets up a trusted relationship between the two phones for the future, similar to the relationship between nodes in a home or workgroup network of computers. Different types of settings may be offered, such as, for example, "Always allow" or "Always ask" in the case of a request to transfer data. In step 1125, initiating phone 1011 sends a selected object to receiving phone 1001, and in step 1127, receiving phone 1001 receives the object. The user may be prompted to accept the object, particularly depending on the nature of the object. This process may continue until all desired objects are transferred. In some cases, the transfers may be bidirectional; in other cases, they are only unidirectional. Both phones end their communications in step 1129 and 1130, respectively, after which a new session must be started again from step 1121 to send more data. When the application is installed, depending on its permissions settings, it may remain in the phones and permit new connection for data transfers without reinstallation, or it may allow such connections only with user approval. However, in other cases, the application may be deleted after each session for purposes of security.

Further Enhanced Implementation

What is needed is a system and method that can transfer the data of either multiple devices simultaneously or one device on a one-to-one basis in sequence, using wireless connections and thus avoiding connection problems such as defective connectors, unavailable infrastructure, etc.

Figure 12:
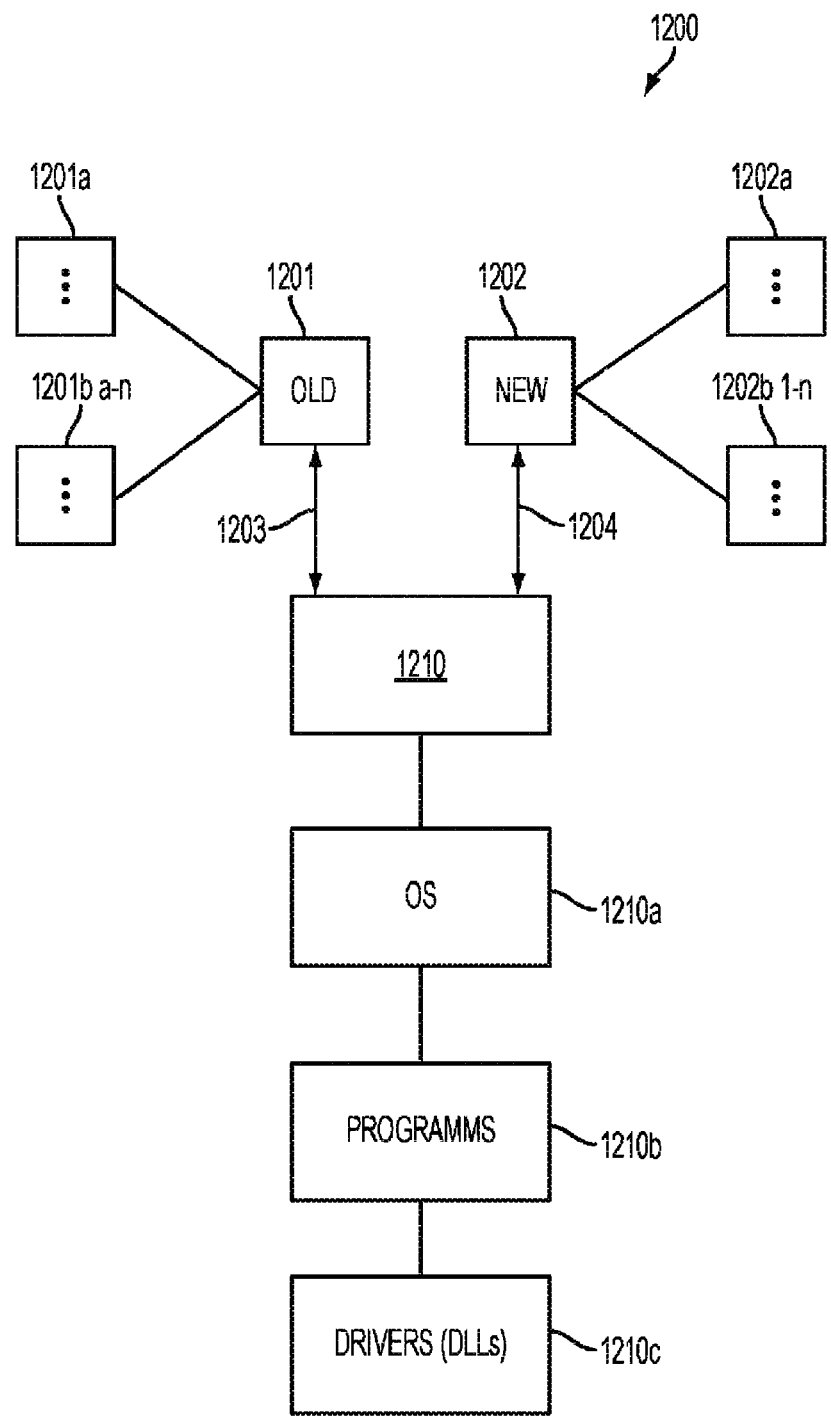
FIG. 12 shows a block diagram illustrating a transfer station.

FIG. 12 shows transfer station 1200. Station 1200 has a phone data transfer machine (PDTM) 1210, typically a PC with USB and Bluetooth connectivity running phone data transfer applications such as PC Suite, PC Tools and other phonebook transfer applications, which typically may connect to two handsets: originating handset 1201 and a receiving handset 1202. These connections are, in some cases, typically made via any suitable wireless connection such as 1203 or 1204, including, but not limited to, Bluetooth, Wi-Fi, ZigBee, or any other suitable wireless protocol, or over the wireless carrier network and via the Internet (not shown) to device 1210. For this purpose, device 110 may have one or more additional wireless interfaces (not shown for clarity). In some cases, these interfaces may reside in one or more access points (not shown) connected through a local area network (not shown). Also, device 1210 may, in some cases, support more than two sets at a time. Thus, a single device could support, for example, transfer between four pairs (i.e., total of eight devices, four old devices and four new devices). Each phone has its own operating system with software 1201a and 1202a, respectively, and data sets 1201b1-n and 1202b1-n, respectively. This data may contain all kinds of information, including, but not limited to, address book data, phone numbers, email addresses, pictures, video clips, and other types of data that may be used by cell phones and their applications. In some cases even the applications or the application data may be transferable. Typically machine 1210 would have its own operating system 1210a, which has multiple programs 1210b. in some embodiments, machine 1210 with operating system 1210a and programs 1210b is actually a custom, dedicated PC, and as such it contains drivers or DLLs 1210c for all the phones to which it may be connected. As a result of having a large library of DLLs (or drivers, used interchangeably here) almost any data transfers between two different phones can work. The machine can, by using the DLLs, communicate and download the data objects (each item typically comes down as one or more data objects from the phone), which are then stored in machine 1210 temporarily and eventually sent on to the other phone, as its data objects, using the matching DLL. In various embodiments, each of these devices has a CPU and memory, both volatile and nonvolatile, and thus each forms a small, distinct computing device.

What is needed is a system and method that allows connection of telephone devices of unknown or questionable origin, with incorrect or spoofed VID/PID, and the ability to provide services such as data transfer, software repair of damaged flash, etc.

Figure 13:
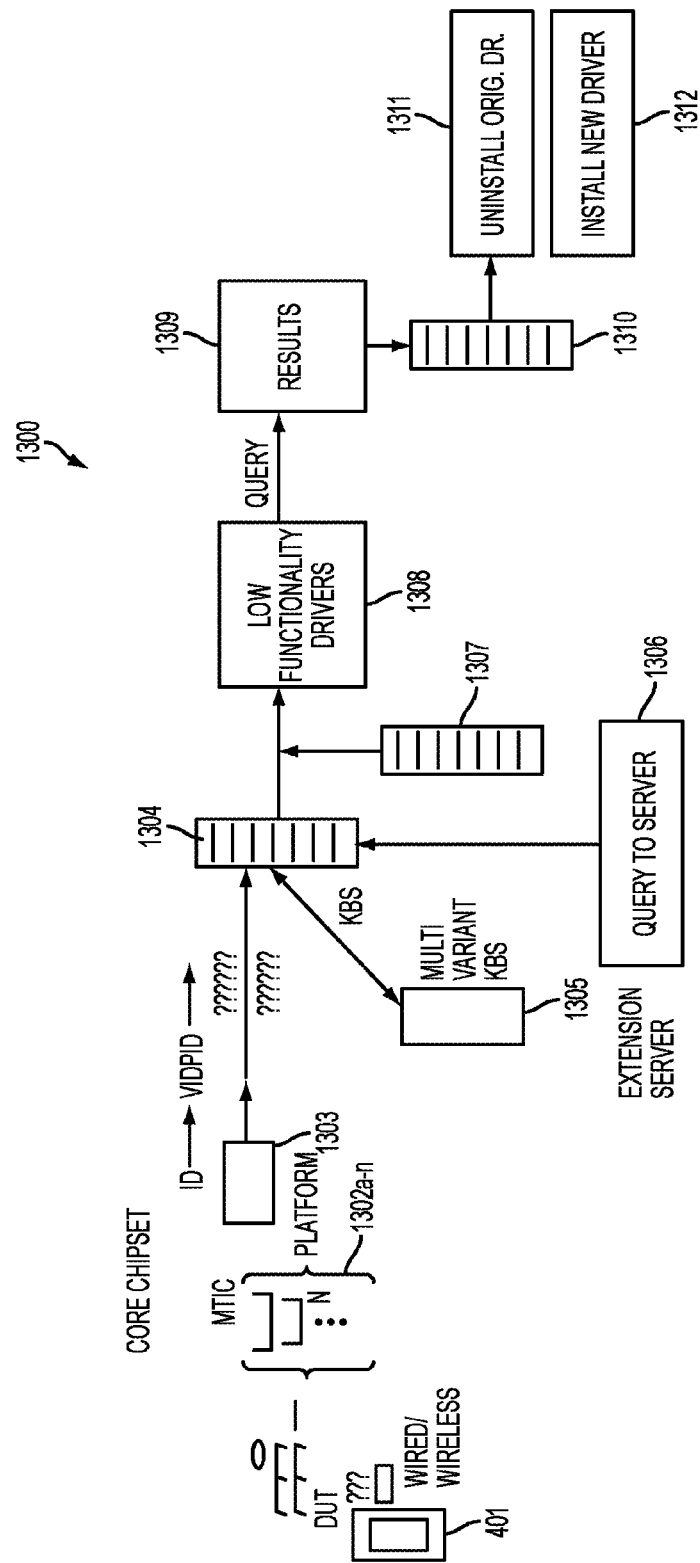
FIG. 13 shows an exemplary process for discovering the actual identity of a telephone device.

FIG. 13 shows an exemplary process 1300, according to one aspect of the system and method disclosed herein, for discovering the actual identity of a telephone device, which actual identity may differ from the indicated identity of said device, and installing correct drivers for said device. A device under test (DUT) 401 is connected via a wired connection or wirelessly to system 1300. At step 1303 the system attempts to determine the ID of DUT 401, typically by determining the VID/PID from the USB or from the wireless plug 'n' plays used. In general, only a few actual distinct platforms of chipsets, symbolized as elements in list 1302a-n, are widely used. Currently about seven main platforms are in use, including, but not limited to, platforms from chipset manufacturers such as MTK, Infineon, Motorola, Qualcomm, Nokia, etc. However, myriad variations are made in designing telephone or mobile computing devices using those chipsets, both in the chipsets from the chipset manufacturers mentioned above, as well in as custom modifications by handset manufacturers that add additional chips, software, and software modifications, resulting in a complex, vast array of combinations and permutations of the platform elements used in a device, sometimes within the same VID/PID. This VID/PID (referred to as ID here) is then compared to the contents of a look-up table 1304, where the device may be identified. Table 1304 is a part of a knowledge base (not shown), which contains various tables and data accessed by the system. If the look-up list does not return a conclusive ID result, meaning that more than one model and/or hand set manufacturer (HSM) are using it, the system then queries table 1305, which has multi-variant content. This is a list of devices that are known to have multiple variants. Also, in some cases, the system may prompt the user to enter additional information, or the system may send a query from server 1306. This server 1306 may be used, for example, as a common knowledge base for all or a group of service entities, such as, for example, within a certain store network, or provider network, to allow knowledge acquired at one entity to be shared among all entities. Queries to a user may include a request that the user manually enter an International Mobile Equipment Identity (IMEI) number, an electronic serial number (ESN), a serial number, or any other, similar type of marking on the device, as well as a model number from the device. However, as previously noted, some manufacturers may mark a device with a known model number, such as, for example, N95 from Nokia or the Apple iPhone model number, even though the device is not from the indicated manufacturer and is, in fact, a counterfeit device. Once the device has been identified, the system looks up its correct driver from a list of drivers in table 1307, and then in step 1308 it installs a low-functionality driver that can make additional queries into the handset's operating system in step 1309 for further identification of a HSM and model number. The results of these queries are applied to a second look-up table 1310 that lists of all the drivers. With the correct driver determined from table 1310, in step 1311 the system uninstalls the low-functionality driver and, in step 1312, it installs the correct driver.

Figure 14:
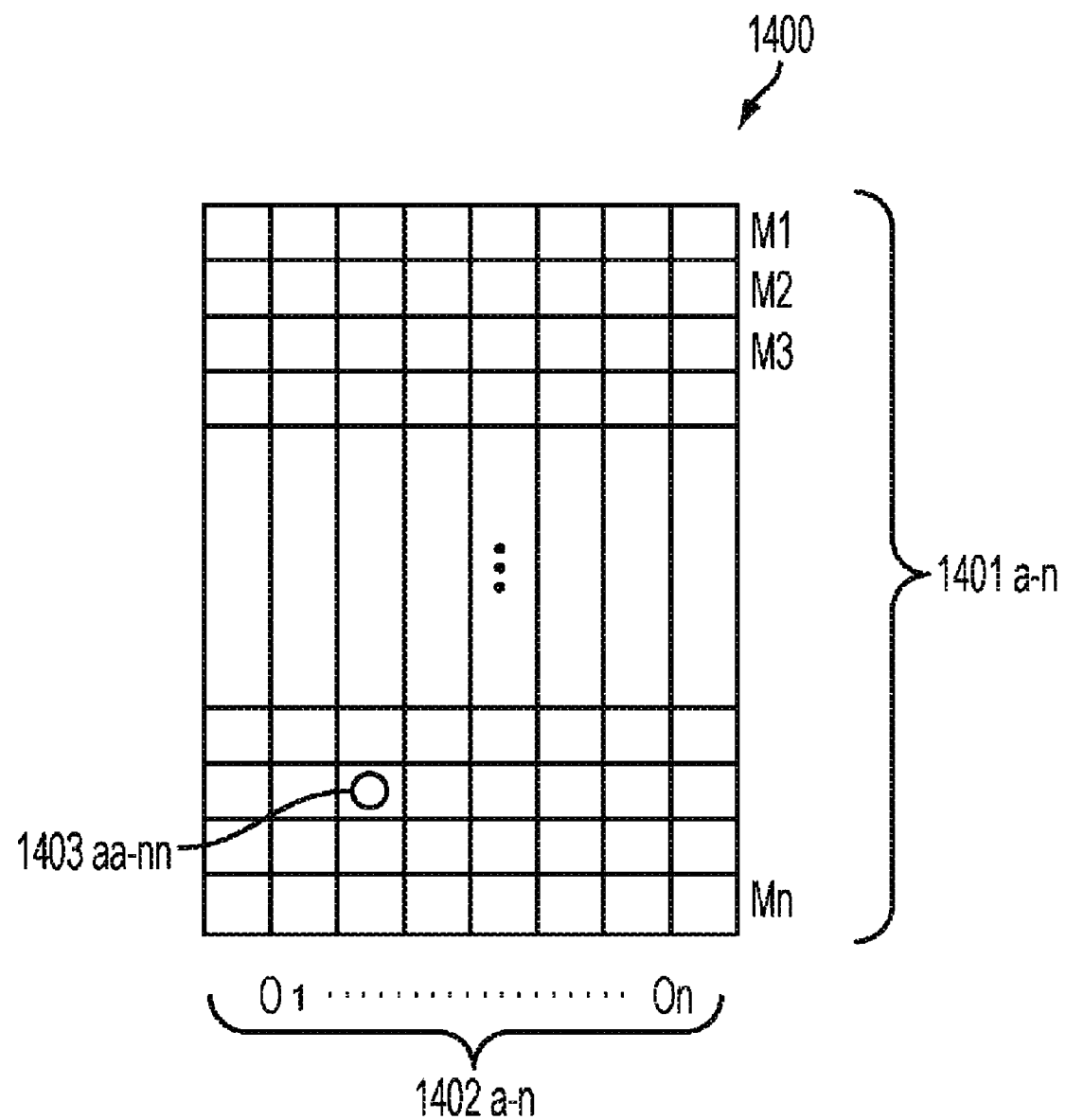
FIG. 14 shows an overview of an exemplary table.

FIG. 14 shows an overview of an exemplary table 1400, typical of tables 1304, 1307, or 1310. Table 1400 shows OEM IDs O1 through On 1402a-n and model numbers M1 through Mn 1401a-n. Thus a user or the system as disclosed herein may create a cross reference 1403aa-nn from the OEM ID and the model numbers appearing within a certain VID/PID of that OEM. Some OEMs, for example, use the same VID/PID for several model numbers as they quickly change chip versions, but do not change the overall device architecture. However, different chip versions may have different functions and features, as well as different internal memory, and thus may need different diagnostic tools and/or different transfer tools to recover and transfer and reinstall the operating system, as well as applications, data, and user information, such as calendar, address book, images, video, etc. By providing this dynamic look-up and problem-management tool, the system can flexibly adapt itself.

Figure 15B:
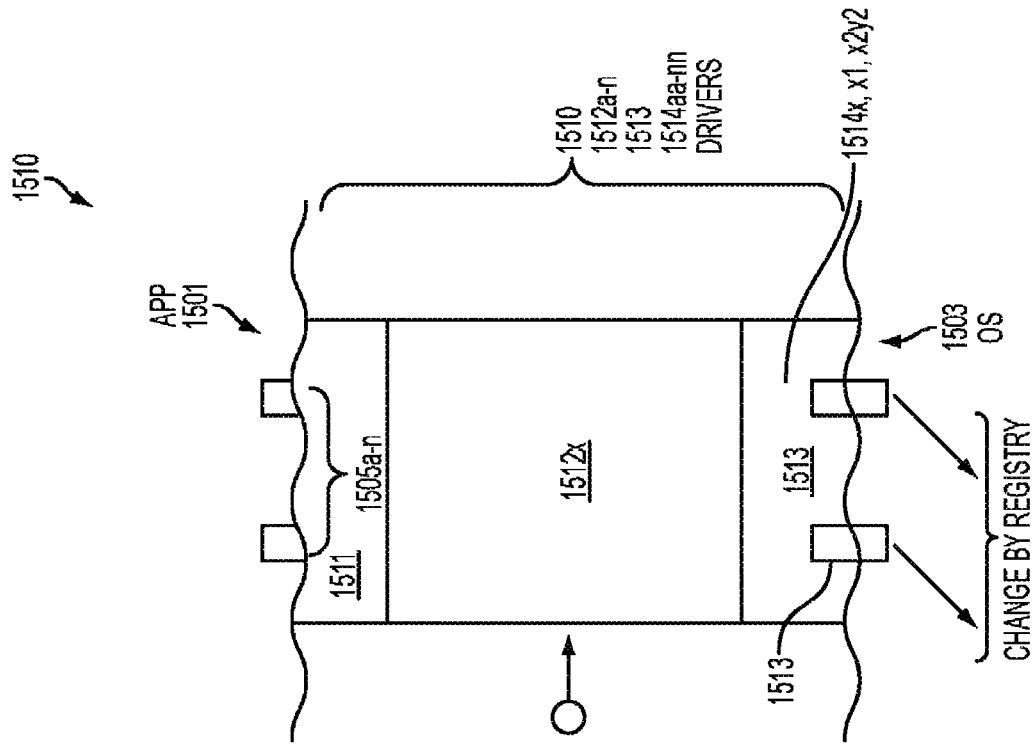
FIGS. 15A and 15B illustrate a system and method for exchanging drivers.
Figure 15A:
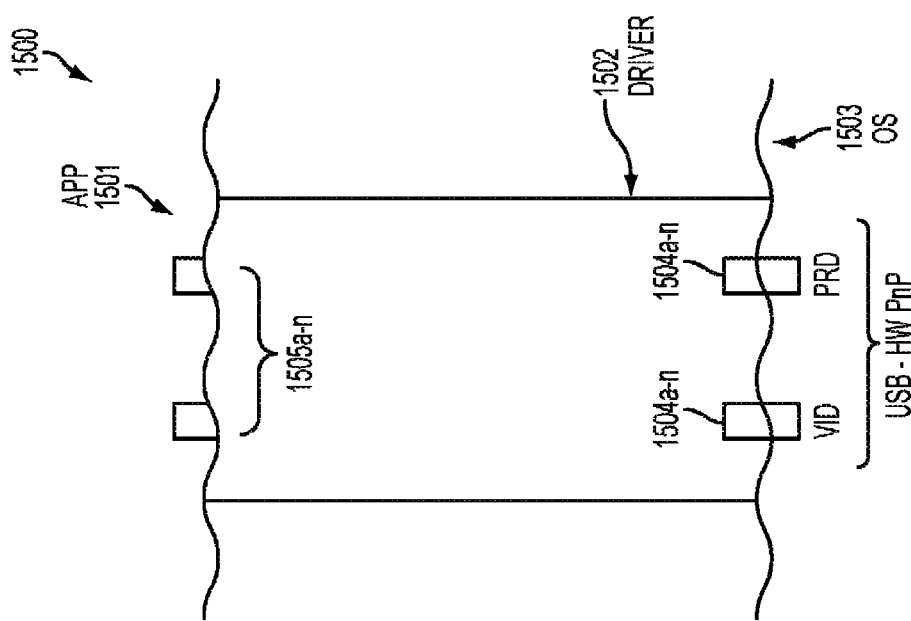

FIG. 15 shows an additional aspect of the system and method disclosed here, namely, an innovation to speed up the process as, during the discovery of a device, multiple drivers may need to be exchanged, and that operation can take a long time using the typical plug 'n' play process. A new approach for exchanging drivers is herein proposed:

FIG. 15a shows an overview of a classic driver model 1500 as is well known in the art, with the application 1501 sitting on top of the driver 1502 and the OS 1503 sitting below, and the driver having the VID/PID and other interfaces to software and hardware plug 'n' play, etc., as indicated by elements 1504a-n, and interfaces to the applications 1505a-n.

FIG. 15b shows a novel approach 1510 for a driver stack layer view, according to one aspect of the system and method disclosed herein. Reinstalling the whole driver every time requires massive changes in the registry. In the novel approach of the system and method disclosed herein, for drivers that have the same VID/PID (or even different VID/PID in some cases), the driver is cut into three sections: application-facing 1511 (with subsections 1505a-n)" the main body 1512x (which can be now exchanged without requiring a reboot), and OS-facing section 1513 (with subsections 1514xy out of 1514aa-nn). In this embodiment, section 1511, which contains certain functional elements 1505 a-n of the driver, is now absorbed as part of the application 1501 and, as such, is no longer a part of the driver. Section 1512x contains the remaining portions of the driver, which, in many applications, can be represented by a uniform driver that has a small footprint and can load relatively quickly. This novel approach no longer requires the loading of all functional elements in 1511 with its subsections 1505a-n and 1512x, which may require a long time to load, but only the uniform driver 1512 together with selected functional elements 1505a-n in 1511 that are necessary to interface to a particular device. Not having to load unnecessary functions can save a significant amount of time. Further, section 1513 interfaces to the OS, and main driver section 1511x can be easily interchanged with any of 1511a-n (not shown), without requiring a reboot every time.

In some cases, the VID/PID is exchanged by writing directly into the registry, rather than by a full plug 'n' play installation. This novel approach has the advantage that the typical change time is now in the millisecond or low seconds range, instead of the tens of seconds typically required currently to uninstall and reinstall a driver. Because up to a dozen or two dozen drivers may need to be tested for a single a phone, the total time to test drivers could become a burden to a business if each uninstall and reinstall cycle of a driver takes up to a minute or longer.

Figure 16:
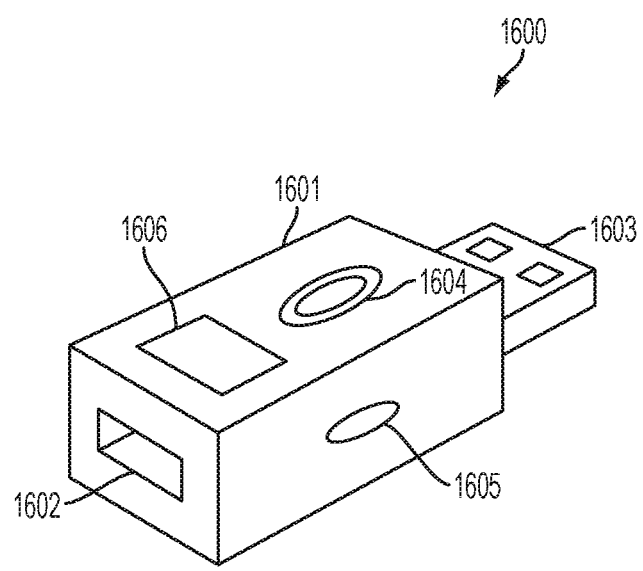
FIG. 16 shows an overview of an exemplary device according to one aspect of the system and method disclosed herein.

FIG. 16 shows an overview of an exemplary device 1600 according to one aspect of the system and method disclosed herein. Device 1600 is, in this example, a USB key 1601. Device-oriented port 1602 can accept a standard USB interface cable for connection from a small mobile communication device (not shown). Computer-oriented connector 1603 may plug into a computing device (not shown), such as the exemplary computer of FIG. 7 or any other, similar standard PC. Connector 1603 may, alternatively, plug into a USB power supply (not shown) to supply power to USB key 1601, if the communication device to which it is attached does not supply enough power. A user may press button 1604 to initiate operation of USB key 1601. (It is clear that button 1604 is exemplary only, and that any of various types of switches, buttons, toggles, keys, etc. may be used to initiate operation.) In some cases a medium for addition data storage may plug into slot 1605. USB key 1601 also has a small display 1606.

Figure 17:
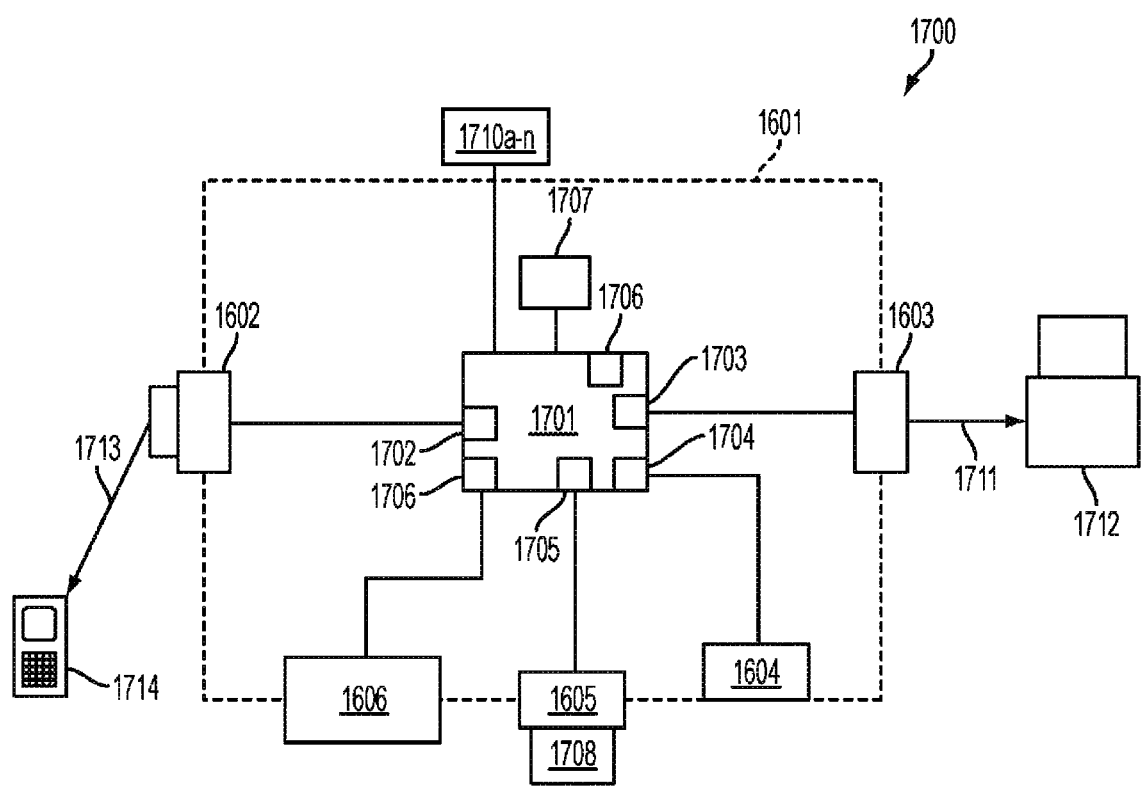
FIG. 17 shows an overview of device architecture.

FIG. 17 shows an overview of device architecture 1700, according to one aspect of the system and method disclosed herein. Again, computer-facing USB connector 1603 is connected via USB cable 1711 to a computer 1712, of the type of complete computer system shown in FIG. 7. The unit 1601 contains, in this example, system on a chip (SOC) 1701. SOC 1701 contain a processor, some volatile memory, and some nonvolatile memory. The nonvolatile memory contains software 1710a-n and additional modules described later. It is also used to store and/or to provide information such as address book data, pictures, music, or any other information useable on smart phone 1714, as well as the embedded operating system, and drivers and tables to communicate with a variety of different devices 1714. Device-facing interface 1602 is connected via USB cable 1713 to communication device 1714. Display 1606 may comprise just one LED, a multi-color LED, multiple LEDs, a small LCD, or any other, similar display type. The SOC 1701 has specific interfaces, such as 1706, to drive and/or interface with respective units, such as, in this case, display 1606 (and/or other output devices, such as OLEDs, LEDs, LCDs, etc.). Port 1705 serves for connecting additional storage, in this example, to slot 1605, which may accept a micro SD card 1708. Other interfaces may be supported as well, but are not shown for clarity. Button 1604 is also connected to the SOC via interface 1704; in a similar manner, computer-facing USB connector 1603 is connected to SOC 1701 through interface 1703. Internal memory 1706 contains at least a boot-strap software for SOC 1701. External, additional nonvolatile memory 1707, may contain additional code, drivers, etc., as described in the discussion of FIG. 18, following. Memory 1707 may or may not be present. In some cases, the system memory 1706 may have minimal capacity, and it may only transfer data between smart phone 1714 and computer 1712. In other cases, memory 1707 may have limited capacity, requiring the presence of external memory 1708 for full backups. In some cases, for example, without external memory 1708, device 1600 could back up only, for example, information about 100 contacts; whereas, the addition of external memory 1708 (for example, a flash memory card) would enable backup of all data in the communication device, including even pictures, music, and video. After connecting the device 1601 to phone 1714, and, if necessary, to a power source, such as computer 1712 (or in lieu, not shown, a USB battery pack) to power it up if no power is available from smart phone 1714, as indicated by lack of a light on display 1606, it is then used, as described throughout this disclosure.

Figure 18:
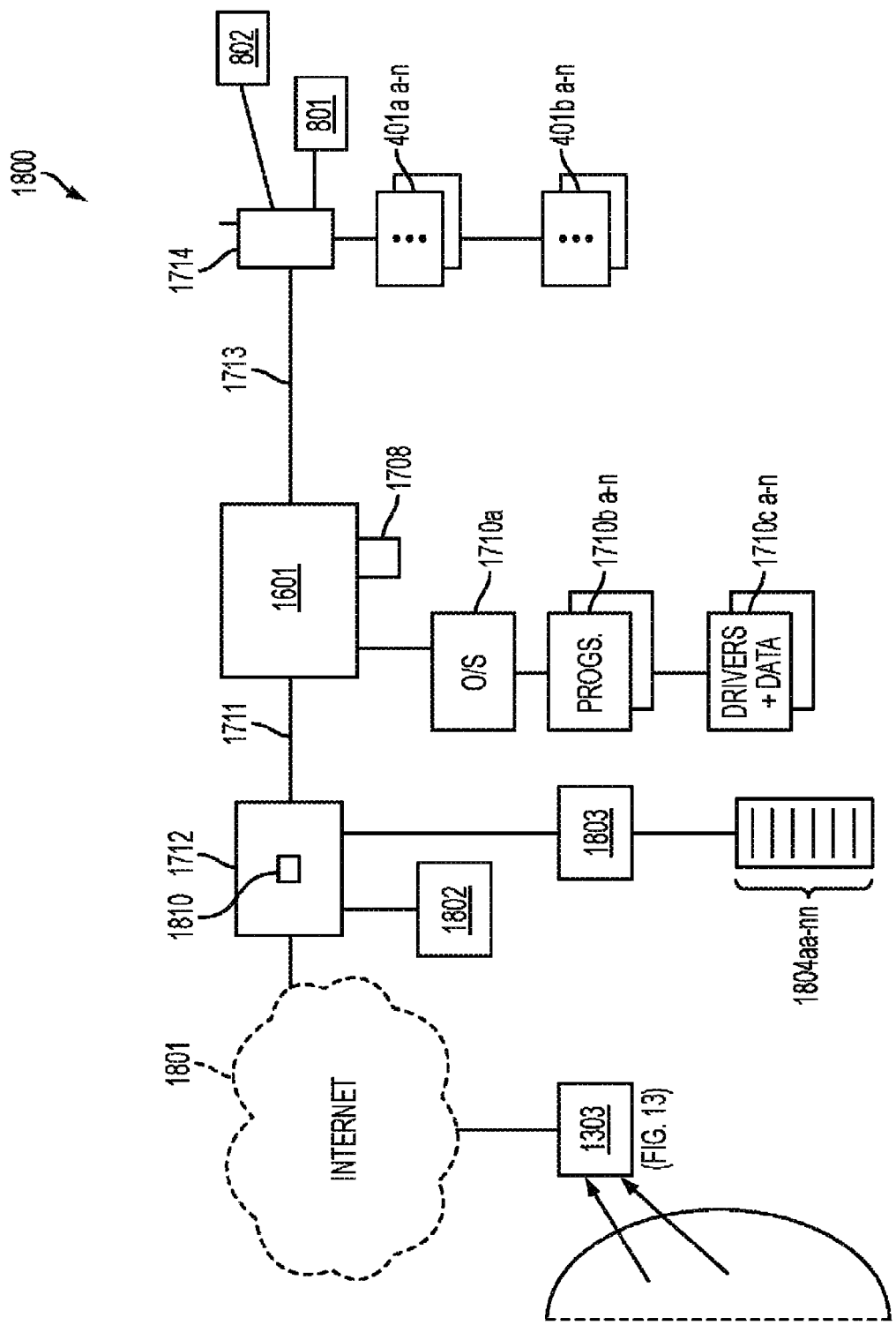
FIG. 18 shows a detailed overview of an exemplary system for updating software in a device.

FIG. 18 shows a detailed overview of an exemplary system 1800 for updating software in device 1601 to enable connecting it to a mobile communication device 1714 for which it does not have information, according to one embodiment of the system and method disclosed herein. In FIG. 18, computer 1712 is typically a PC with USB and Bluetooth connectivity running phone data transfer applications such as PC Suite, PC Tools and other phonebook transfer applications, which typically may connect one or two handsets, such as the handset of a device under test (DUT) 1714 as shown in FIG. 18. These connections are typically made via USB cables 1711 and 1713. Computer 1712 has its own operating system 1802 with software 1803a-n and data sets or embedded operating systems 1804a-n (not shown) for execution on SOC 1701 in device 1601. This data may contain all kinds of information, including, but not limited to, address book data, phone numbers, email addresses, pictures, video clips, and other types of data that may be used by cell phones and their applications. In some cases even the applications or the application data may be transferable. Typically computer or machine 1712 would have its own operating system 1802, which has multiple programs 1803*a-n*, including a probing/programming application 1803*x* (not shown separately).

Often computer 1712 with operating system 1802 and programs 1810*b* (not shown) is actually a standard PC, and as such it often has lots of other, not relevant software as well. It can combine DLLs, data tables, and configuration data 1804*aa-nn* for most phones 1714 to which it may be connected via unit 1601. These data tables and configuration data also contain an identification of combinations of programs and drivers that are known to be functional, as well as combinations that are known to have problems. Thus the table can indicate the existence of problems. If a driver is not supported, a new configuration is prepared and loaded into device 1601, as described later in more detail. Operating system 1710*a* of unit 1601 is typically an embedded type, such as Unix, Linux or some other, similar embedded, dedicated system. It uses certain programs 1710*b a-n*, and they use drivers or driver tables 1710*c a-n*. Driver tables, in this example, enable a device to use a formulaic driver, instead of a device-specific driver, said formulaic driver using tables and scripts that provide the actual driver functions for the specific device. Thus a single software instance may offer drivers for a variety of devices. However, no matter how diligently a formulaic driver is designed, the number of drivers in the device may be limited by the capacity limitations of memories 1706 and 1707. Additionally, as novel smart phones 1714 appear in the market that are not supported by the existing drivers 1710*c a-n*. Computer 1712, which connects via cable 1711 to unit 1601, has its own operating system 1802, typically a Windows or Linux operating system, and it has an application 1803*x* that contains an enclosed environment 1803*y* that can assemble and create new operating environments for unit 1601, including but not limited to the embedded operating system and its drivers. Thus computer 1712 creates a new image in its internal memory 1810, and then the image is transferred to a flash memory, such as, for example, external memory 1708 in unit 1601, and from there the internal memory 1706 (not shown here) can be used to reprogram itself and/or internal memory 1707 (not shown here, but shown in FIG. 17). This image transfer and reprogramming enables the system to very easily reprogram the firmware in USB key 1601 to adapt to new devices that have not previously been supported. Computer 1712, in turn, can connect via Internet 1801 to expert system as explained in the discussion of FIG. 13, previously, at step 1303, which has access to all the databases of all the drivers and formats for connecting to devices. To identify new communication devices, such as device 1714, the system can switch unit 1601 into transparent mode, enabling the more powerful software in computer 1712 to probe device 1714, to determine its model and possibly the parameters needed to parameterize new drivers. The system can then store those new drivers and/or tables in tables 1804, report them back to 1303 for its database, and then recreate a new environment in memory 1810 that can be reflashed into key 1601, which from now on can service device 1714 independently, without connecting to computer 1712. In some cases, however, key 1601 may still need a power supply device, such as a USB battery, to supply power if the device 1714 cannot supply sufficient power to operate the processor 1701 and other items in key 1601. Further, in cases where no suitable driver and or table is present, by downloading an additional diagnostic program 1803*z* (not shown separately) that supports additional manipulation and tests beyond programs already present in 1803 *a-n* and/or drivers and tables in 1804*aa-nn*, newer smart phones can be added to the capabilities of device 1601. As a result of having a large library of DLLs (or drivers, used interchangeably here) almost any data transfers between two different phones can work. The computer 1712 can, by using the available drivers and tables, communicate via device 1601 with smart phone 1714 and test download of data objects (each item typically comes down as one or more data objects from the phone), and thus identify the correct combination, which is then stored in memory 1810 of computer 1712 temporarily and eventually sent on to device 1601, as described later, enabling it to connect the phone 1714 by itself, for backing up data objects, without use of a computer 1712. Each of these devices may have a CPU and memory, both volatile and nonvolatile, and thus each can form a small, distinct computing device.

Figure 19:
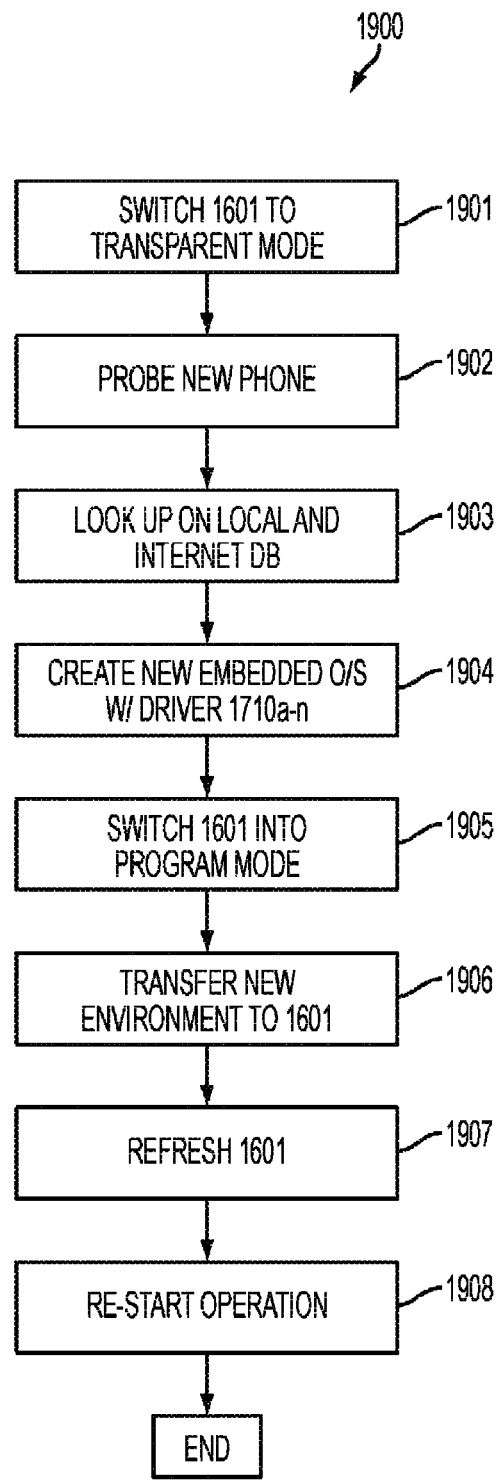
FIG. 19 shows a detailed overview of an exemplary system for updating software in a device.

FIG. 19 shows an exemplary process 1900 for updating software in a device 1601. In step 1901, the system switches unit 1601 to transparent mode. In step 1902, computer 1712 probes mobile communication device 1714 (via device 1601, which is now transparent) to determine its model and possibly the parameters needed to parameterize new drivers. In step 1903 the system looks up the identity and drivers of device 1714 on both local computer 1712 and a remote expert system, as explained in the discussion of FIG. 13, previously, at step 1303. In step 1904, the system creates a new embedded operating system for device 1714 with drivers 1710*a-n*. In step 1905, the system switches unit 1601 to programmable mode, and in step 1906, it then transfers the newly created operating system and drivers to unit 1601. In step 1907, the device 1601 is reflashed, meaning that part or all of the content of the software section of one or more of its nonvolatile memory units (typically, but not always flash memory) is reprogrammed with the downloaded data from step 1906, making the change definitive. In step 1908, the system restarts the operating system of unit 1601, and then the process terminates.

Figure 20:
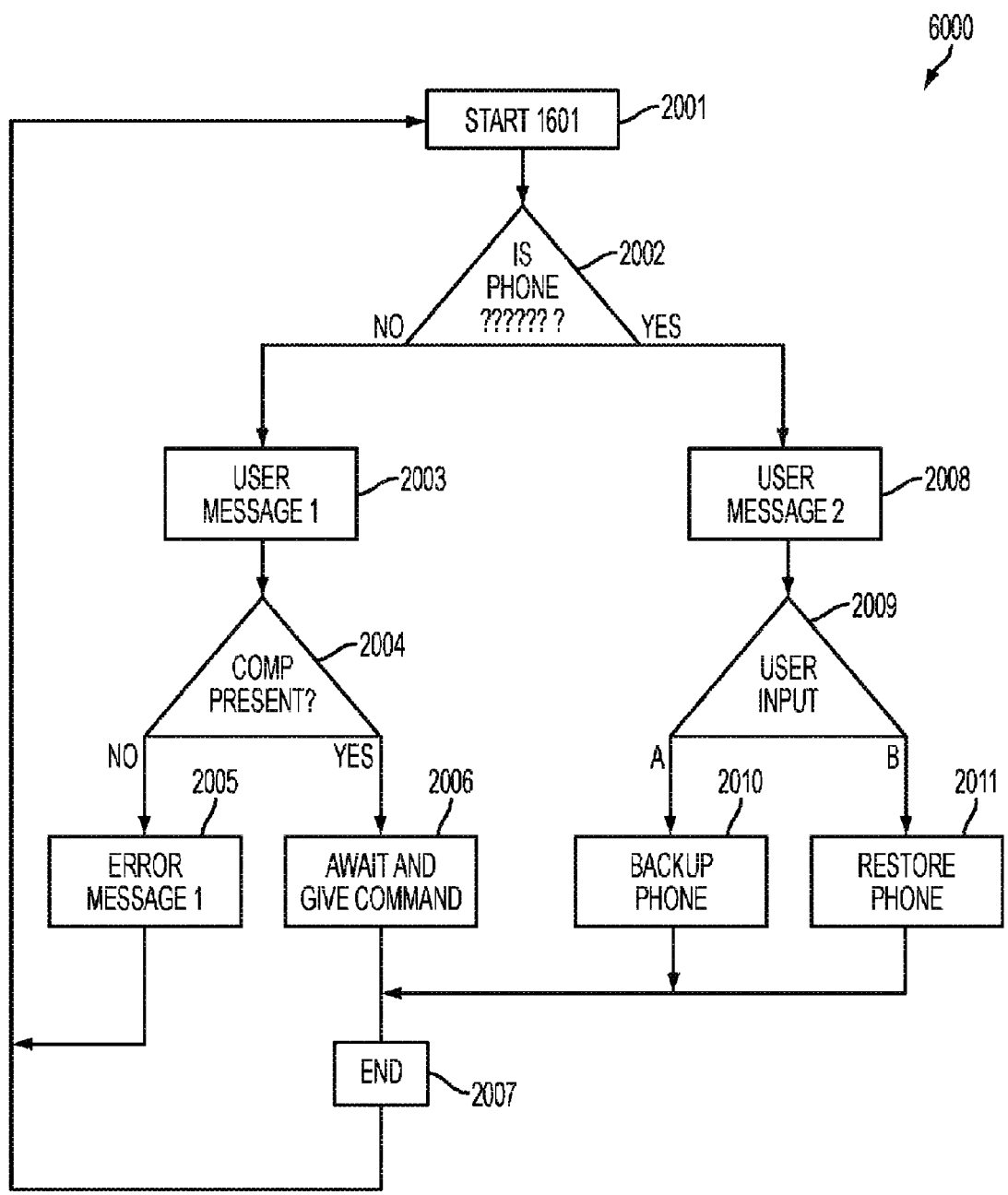
FIG. 20 shows an exemplary process for backing up data from a mobile communication device.

FIG. 20 shows an exemplary process 2000 for backing up data from a mobile communication device, such as device 1714, according to one aspect of the system and method disclosed herein. In step 2001, unit 1601 begins operation. In step 2002, unit 1601 determines whether it contains information about the identity of device 1714. If it does not (no), the process moves to step 2003, where it displays a message indicating that it cannot identify device 1714. In step 2004, unit 1601 checks to determine whether it is connected to a computer, such as computer 1712. If it is not (no), unit 1601 displays an error message and the process moves back to step 2001, as it has no useable input (besides power) or output to perform any tasks. In some cases, it may wait for user input before continuing back to step 2001. If in 2004, unit 1601 detects that it is connected to a computer (yes), the process moves to step 2006, where the system executes process 1900, described above, and the process ends at step 2007. If in step 2002, unit 1601 determines that it does contain information about the identity of device 1714 (*yes*), the process moves to step 2008, where unit 1601 displays a message asking the user to choose whether to back up data from device 1714 (A) or restore data to device 1714 (B). If the user elects to back up data, in step 2010 unit 1601 backs up data from device 1714 and the process ends at step 2007. If the user elects to restore data, unit 1601 restores data to device 1714 and the process ends at step 2007.

It is clear that many modifications and variations of this embodiment may be made by one skilled in the art without departing from the spirit of the novel art of this disclosure. For example, the device 1601 may be used with computers 1712 that do not have special software installed by mimicking a flash USB drive, and enabling them to exchange information by reading and writing both by the computer 1712 and processor 1701 to and from that drive. In some cases, the drive may present a section with software that can be installed on a guest computer 1714. In yet other cases, the device 1601 may present itself as both a USB drive and a CDROM with auto-launch, to install software, or to connect to a Website, from which software can be downloaded and installed etc. These modifications and variations do not depart from the broader spirit and scope of the invention, and the examples cited here are to be regarded in an illustrative rather than a restrictive sense.

Enhanced Production System

What is needed is a system and method that enables the parallel programming of many handsets. One of the biggest problems is that the USB connection used by most software for reprogramming handsets has largely unknown limitation: At any given time only one USB device is connected to the host controller and thus to the host. Therefore, if a USB device sends a request while the host is talking to another USB device, that request may be lost. Generally, the device is expected to re-transmit by itself, which is not a problem in normal operating mode; however, often during reprogramming only a very reduced, basic I/O system is available, akin to a bootstrap ROM with very limited capabilities. As a result, if multiple handsets or mobile communication devices, both of which in this example are USB devices, are programmed concurrently, often some "hang up" and the process must be restarted. This hang-up and the associated loss of time and productivity is the result of lost communication packets between the host and the (mobile communication) device being reprogrammed. The way to avoid these frequent packet losses and restarts is to give each USB device its own USB tree with its own USB host controller. The host controller is then dedicated to that device only, and it has the ability to buffer commands before they continue to travel through the PCI bus and into the CPU.

Figure 21:
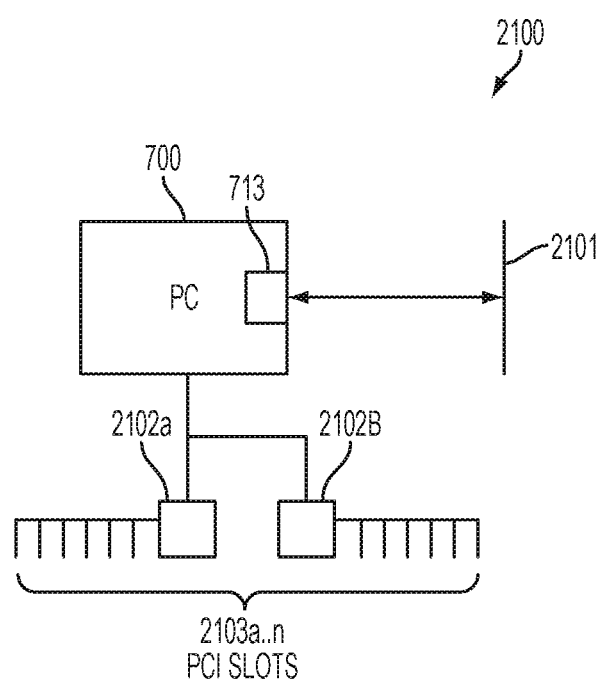
FIG. 21 shows an enhanced system according to one aspect of the system and method described herein.

FIG. 21 shows an enhanced system 2100, according to one aspect of the system and method described herein. System 2100 has a PC 700 (similar to the computing system described in the discussion of FIG. 7), which has an additional enhanced PCI bus/motherboard. Two PCI bridges 2102a and 2102b expand the number of available slots for USB peripheral devices such as mobile communication devices, providing up to 18 such slots. Such computers with up to 18 slots are manufactured for uses such as co-location by telephone companies. For example, 16 USB cards, each of which can handle four phone lines at a time, could be plugged in.

Figure 22:
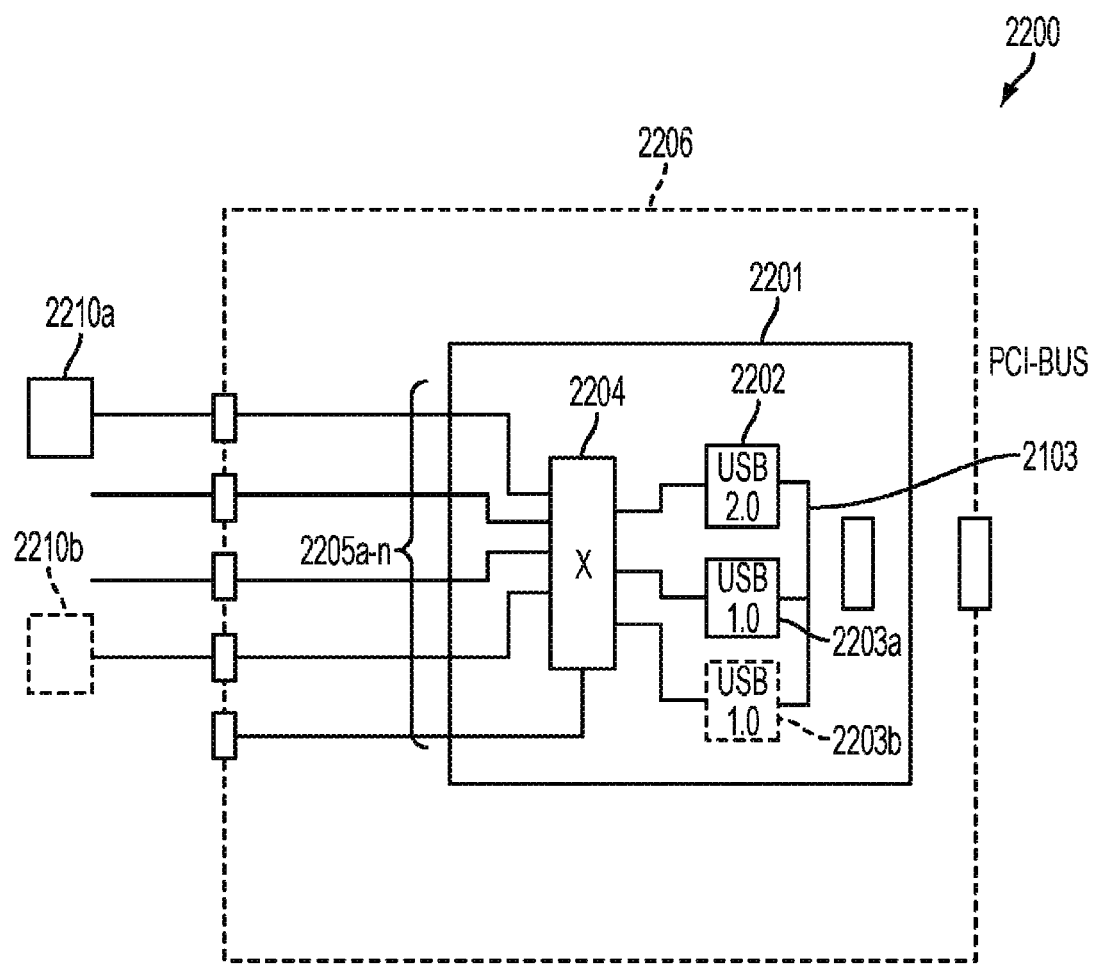
FIG. 22 shows a bus and interface system.

In the case of the system and method disclosed herein, a multitude of PCI cards may be plugged into the available PCI slots 2102a and 2102b, such as, for example, PCI card 2206, shown in FIG. 22. That PCI card 2206 has a typical PCI USB controller chip 2201, which on one side connects to the PCI bus 2103. In this example, PCI card 2206 also has five USB ports, 2205a-n. Typical for PCI cards are five USB ports, one USB host controller 2202 for USB 2.0, and one or two host controllers for USB 1.0 hubs 2203a, and in some cases 2203b. Two USB 1.0 hubs are necessary because in USB 1.0 architecture, each node typically can only address four nodes, and because the card has five ports, at least one port must be addressed by a separate host controller. Cross-matrix 2204 enables the correct connection and selection of the active port(s) to the respective host controllers. Because this exemplary PCI USB controller chip 2201 has two USB 1.0 host controllers, in the case of programming mobile communication devices 2210a-n, which use USB 1.0, two such devices can be programmed concurrently, as long as each device connects to its own host controller 2203a or 2203b. This approach avoids the loss of communication packets. Because in that configuration, once installed and set up, cross matrix 2204 does not change, it therefore maintains a dedicated connection from each device 2210 to each host controller 2201.

Figure 23:
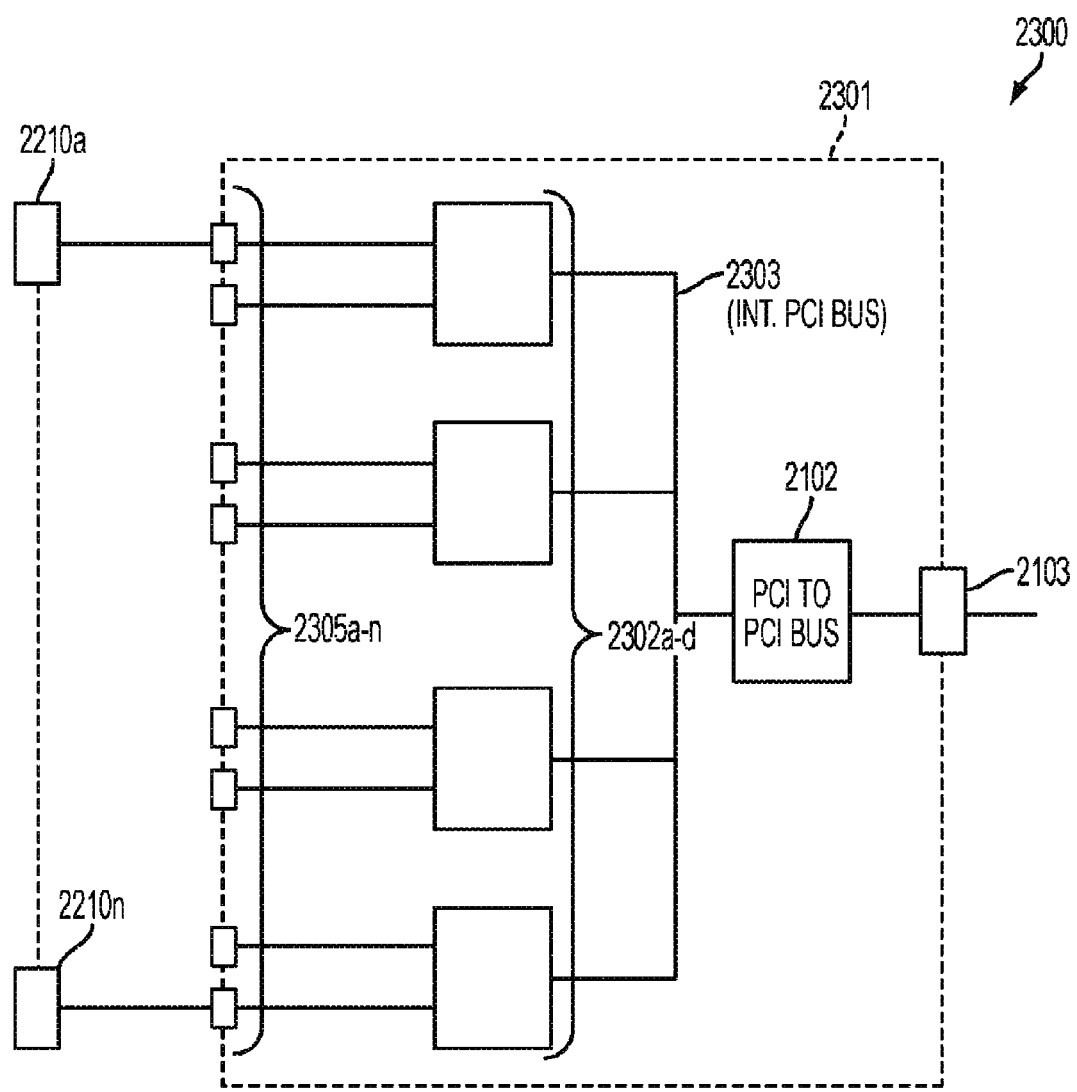
FIG. 23 shows an enhanced USB PCI card.

FIG. 23 shows an enhanced USB PCI card 2301, which has its own PCI-to-PCI bridge 2102. It creates an internal PCI bus 2303, on which multiple PCI USB controller chips 2302a-d are shown. (Typically a PCI segment is limited to four loads.) Each PCI USB controller chip could, using the same architecture described in above in the discussion of FIG. 22, provide two active ports, 2305a-n, thus supporting connection of up to eight USB devices (mobile communication devices), such as devices 2210a-n, to one PCI card. Using this type of card, the capabilities of even a standard office computer, for example, with typically four to six available PCI slots, can be extended. The upper limit of the total number of USB devices in a system is currently 127. Because the motherboard typically contains three to five USB devices and each USB host controller, such as 2202 or 2203, count as one as well, each PCI USB controller chip uses three USB identifiers for itself, limiting the total number available for external USB devices. Also, often system peripherals, such as a sound card, web cam, keyboard, mouse, etc. may be connected through a USB hub and therefore further reduce the number of available USB identifiers. All these uses of USB identifiers must be taken into consideration when calculating how many mobile communication devices can be handled simultaneously by one computer.

Figure 24:
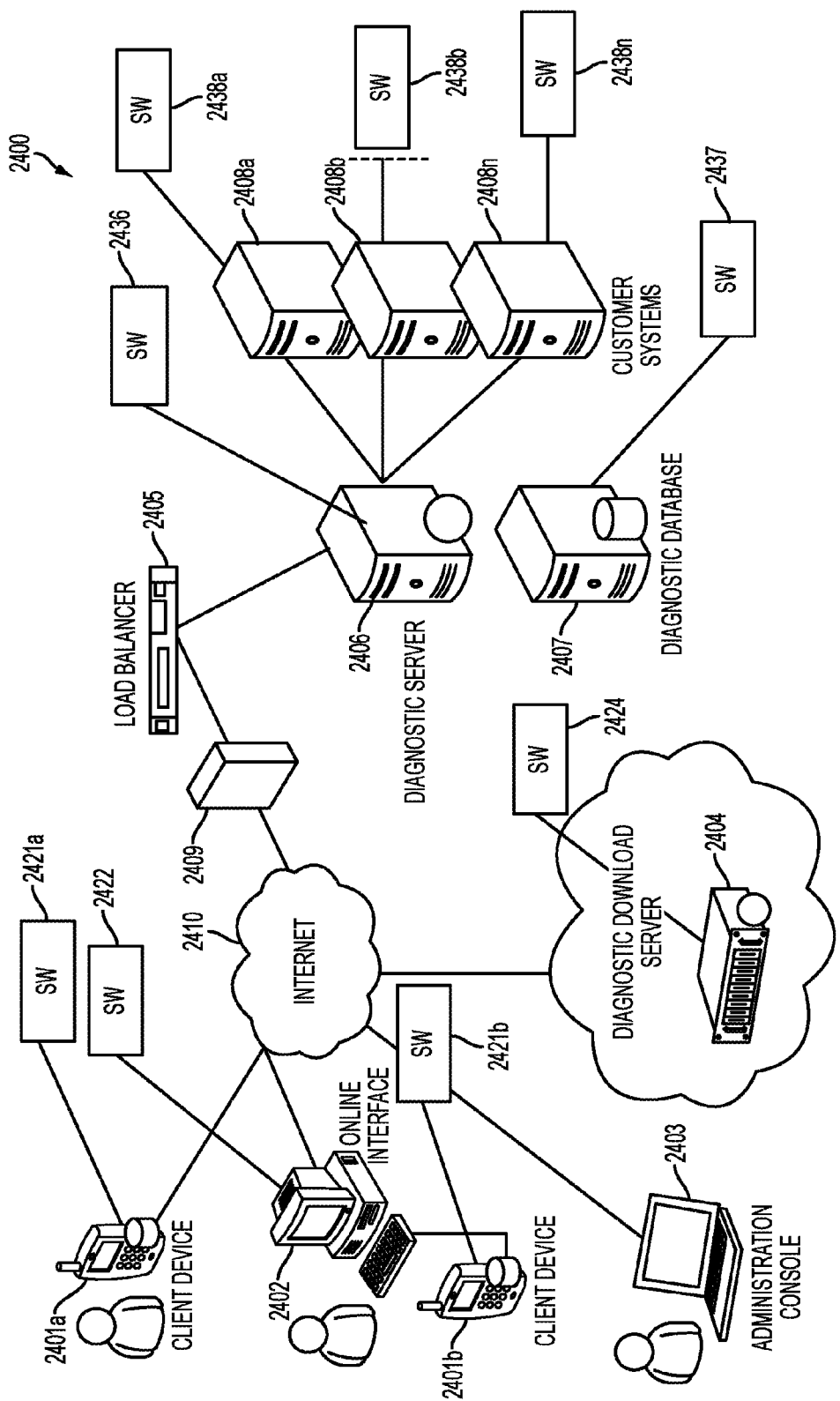
FIG. 24 shows an overview of an exemplary system for enhanced diagnostics.

FIG. 24 shows an overview of an exemplary system 2400 for enhanced diagnostics according to one aspect of the system and method disclosed herein. The devices under test (DUTs) are client devices 2401a and 2401b. DUT 2401a connects to the Internet 2410 via wireless connection (over a network, not shown). DUT 2401b is connected to a computer 2402. Software instances 2421a and 2421b are testing DUTs 2401a and 2401b, respectively. Also, software 2422, such as interconnectivity software or a special driver, may reside on the desktop computer 2402. Between Internet 2410 and load balancer 2405 is a firewall 2409. Often the firewall and the load balancer may be combined. Also shown is a main diagnostic server 2406, which in this case is exemplary of one or more servers. Server 2407 manages a diagnostic database. All servers 2406 and 2407 contain, respectively, software 2436 and 2437. Similarly, customer (i.e., carrier) systems 2408a-n contain software instances 2438a-n. Diagnostic server 2406 may download diagnostic and background data as well as any other related data into server 2404, which may be a local server in the domain of a network provider. Server 2404 contains software 2424, which is a partial or full copy of the system and/or the data downloaded from server 2406, or any of its connected servers. Administration console 2403 may connect to one or more server(s). Typically, console 2403 would not require special software to connect to said server(s), because web interface software could be used, requiring only a web browser. In some cases, however, special client software (not shown) may be downloaded from one of the servers, or a special browser plug-in may be downloaded to enhance performance and reduce overhead during operations.

Figure 25:
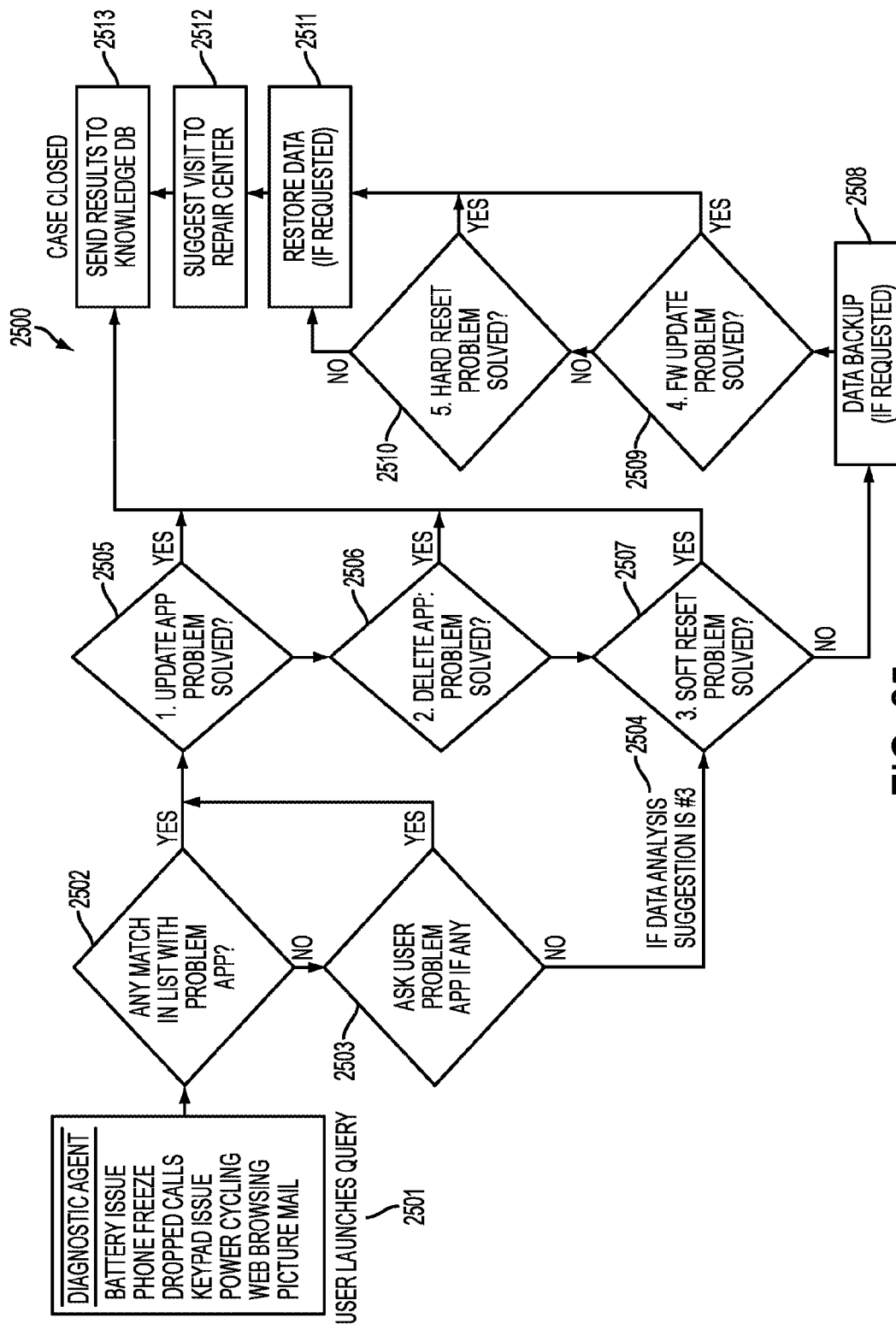
FIG. 25 shows an exemplary process for implementation of the system according to one aspect of the system and method disclosed herein.

FIG. 25 shows an exemplary process 2500 for implementation of the system according to one aspect of the system and method disclosed herein. In step 2501, the user launches the diagnostic application and screen 2511 opens, wherein the user may select from a list the particular application with which he needs help. In step 2502 the system checks if there is an item in the list on the screen, and may have an "Other" field in the list, or in a different menu for the problem application. If not, in step 2503 the system asks the user what the problem is. If it turns out to be that the application exists, the system branches to step 2505. If there is no app, the process continues to step 2504, where it suggests analysis steps outside the automatic venue. The system then continues on to step 2507, where it performs a soft reset of the device. In step 2505, the system updates the problem app. If the problem is solved, the process moves to step 2513, where the system sends the results to the knowledge database. If the problem is not solved, the process moves to step 2506, where the system deletes the application and checks whether the problem is solved. If yes, the process moves to step 2513. In those cases, the offending App can be deleted as part of a trial remedy to resolve an error. If after deletion it was found the App was not part of the problem, then the App would need to be restored. Data backup and subsequent restore could for example, and may be employed in several sections and not necessarily as in this exemplary order. If the problem is not solved, the process moves to step 2507, where the system performs a soft reset of the device. If the problem is solved, the process again moves to step 2513; if the problem is not solved, the process moves to step 2508, where the system performs a data backup and then moves to step 2509, where it updates the device firmware. If the problem is solved, the process moves to step 2511, where the system restores the data; if the problem is not solved, the process moves to step 2510, where the system performs a hard reset. If the problem is solved, the process moves to step 2511, where the system restores the data; if the problem is not solved, system notes the failure but still moves to step 2511 and restores the data. After restoring the data in step 2511, the system in step 2512 suggests a visit to a repair center, and again in step 2513 sends all results, via either wired or wireless communication means, back through the cloud to the knowledge database.

Figure 26:
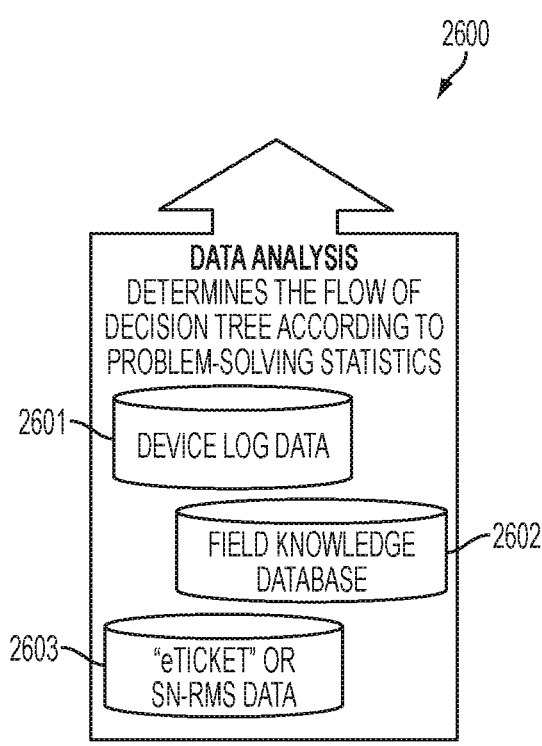
FIG. 26 shows an overview of the data flow as it is analyzed.

FIG. 26 shows an overview of the data flow 2600 as it is analyzed. The initial "eTicket" data 2603 (electronic Ticket or error report) is analyzed in the device 2401a or 2401b respectively by some local software. If that software cannot determine the nature of the problem, the investigation is escalated to the field knowledge database 2602. If that examination does not yield a clear conclusion, the device log data 2601 is pulled into the main diagnostic server 2406 and further analyzed there.

Figure 27:
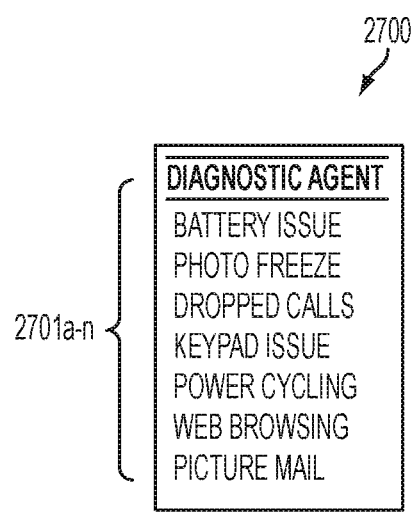
FIG. 27 shows an overview of an exemplary screenshot according to one aspect of the system and method disclosed herein.

FIG. 27 shows an overview of an exemplary typical screenshot 2700, according to one aspect of the system and method disclosed herein, which screen would appear in response to a user request for troubleshooting assistance or in response to a data analysis software conclusion that a problem exists. Screenshot 2700 offers the user a selection of options 2701a-n for investigation. For example, if the user selects option 2701a, the battery issue, another screen opens, as shown in FIG. 28.

Figure 28:
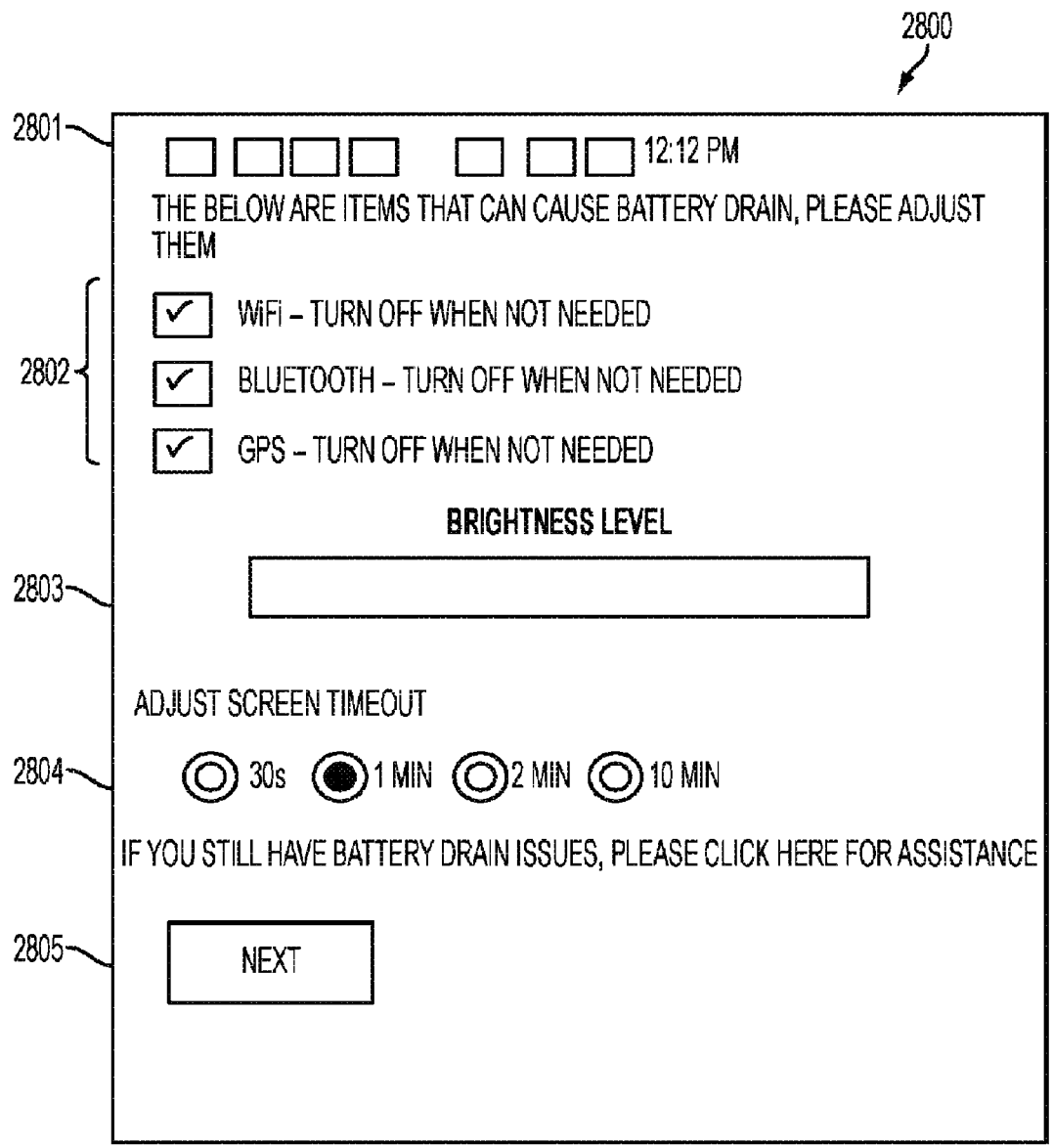
FIG. 28 shows an overview of an exemplary screenshot according to one aspect of the system and method disclosed herein.

FIG. 28 shows an overview of an exemplary typical screenshot 2800, according to one aspect of the system and method disclosed herein. At the top of the screen is an array 2801 of basic information about the device and its functions, such as, for example, its network and its battery. A list 2802 of functions that use battery power and that may be enabled or disabled is presented. Also shown is an option to control brightness level in bar 2803. Screen timeout selections 2804 let the user select the duration of screen illumination after any activity. One or more button(s) 2805 let the user move to the next step in the process. Additional buttons (not shown) may let the user test new settings or selection other options.

Figure 29:
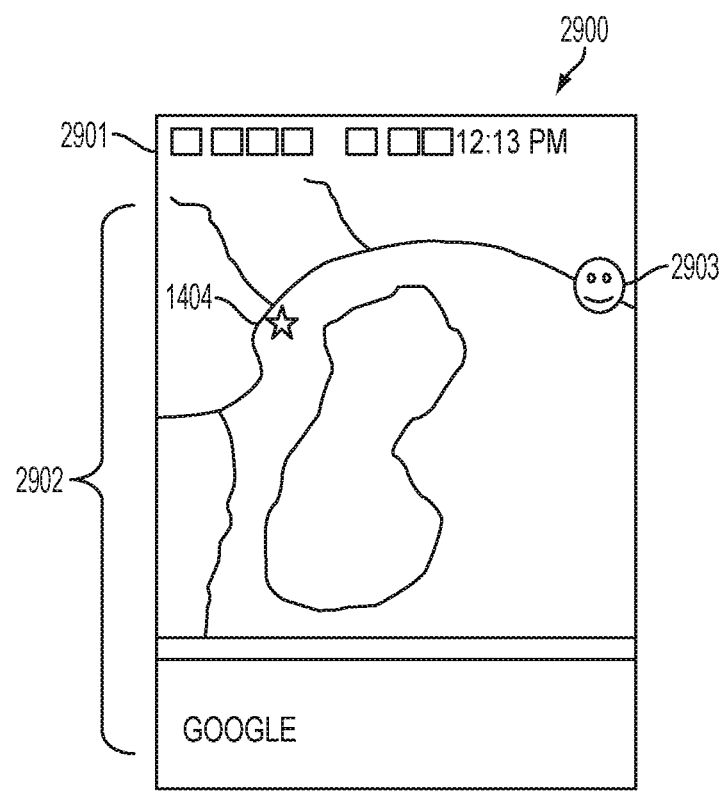
FIG. 29 shows an overview of an exemplary screenshot according to one aspect of the system and method disclosed herein.

FIG. 29 shows an overview of an exemplary typical screenshot 2900, according to one aspect of the system and method disclosed herein, which may open if the user selects a GPS option. Screenshot 2900 shows a map of a selected area. Again, array 2901 shows basic information about the device and about this particular function. Map 2902 shows the selected map, with face icon 2903 representing the user's location and star 2904, the desired destination, typically in this use, the nearest available service location.

Figure 30:
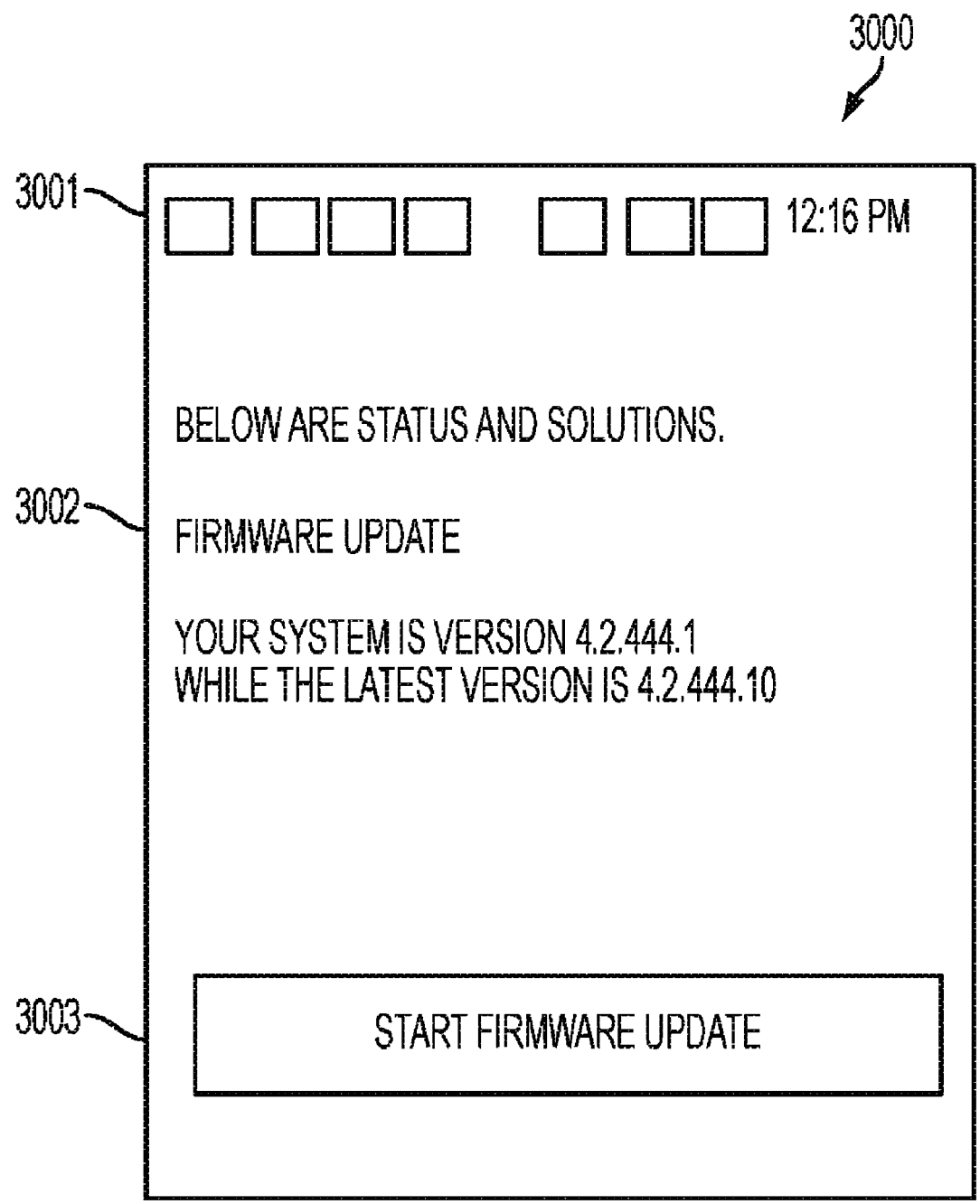
FIG. 30 shows an overview of an exemplary screenshot according to one aspect of the system and method disclosed herein.

FIG. 30 shows an overview of an exemplary typical screenshot 3000, according to one aspect of the system and method disclosed herein, which shows the user that the diagnostic program recommends a firmware upgrade. Again, array 3001 shows basic information about the device and about this particular function. Message 3002 informs the user of the recommended action and give some of the findings of the diagnostic software, and button 3003 prompts the user to start the recommended action. Starting a firmware upgrade may include such system actions as checking that reception quality is adequate, that the user is not driving or flying, that battery level is adequate to complete the task without crashing during the process, and that there is enough space in the device's flash storage to ensure that user information is not overwritten. In some cases, the system may back up user information over the network before beginning the upgrade.

Figure 31:
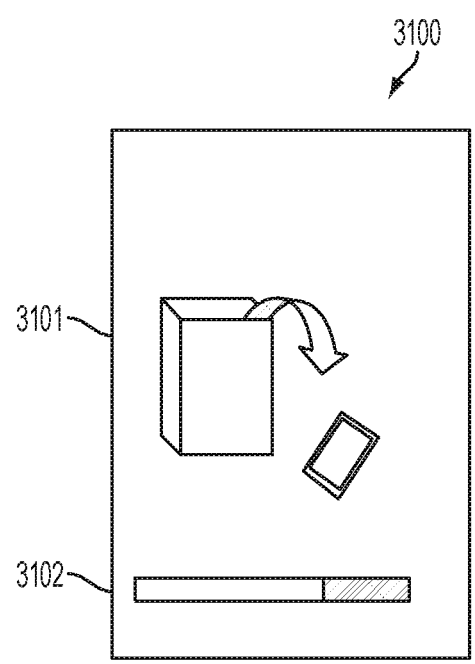
FIG. 31 shows an overview of an exemplary screenshot according to one aspect of the system and method disclosed herein.

FIG. 31 shows an overview of an exemplary typical screenshot 3100, according to one aspect of the system and method disclosed herein, of the type that the system may display to the user on the device during the firmware upgrade. Graphic 3101 indicates that new firmware is moving onto the device, while progress bar 3102 shows the user the progress of the operation.

Figure 32:
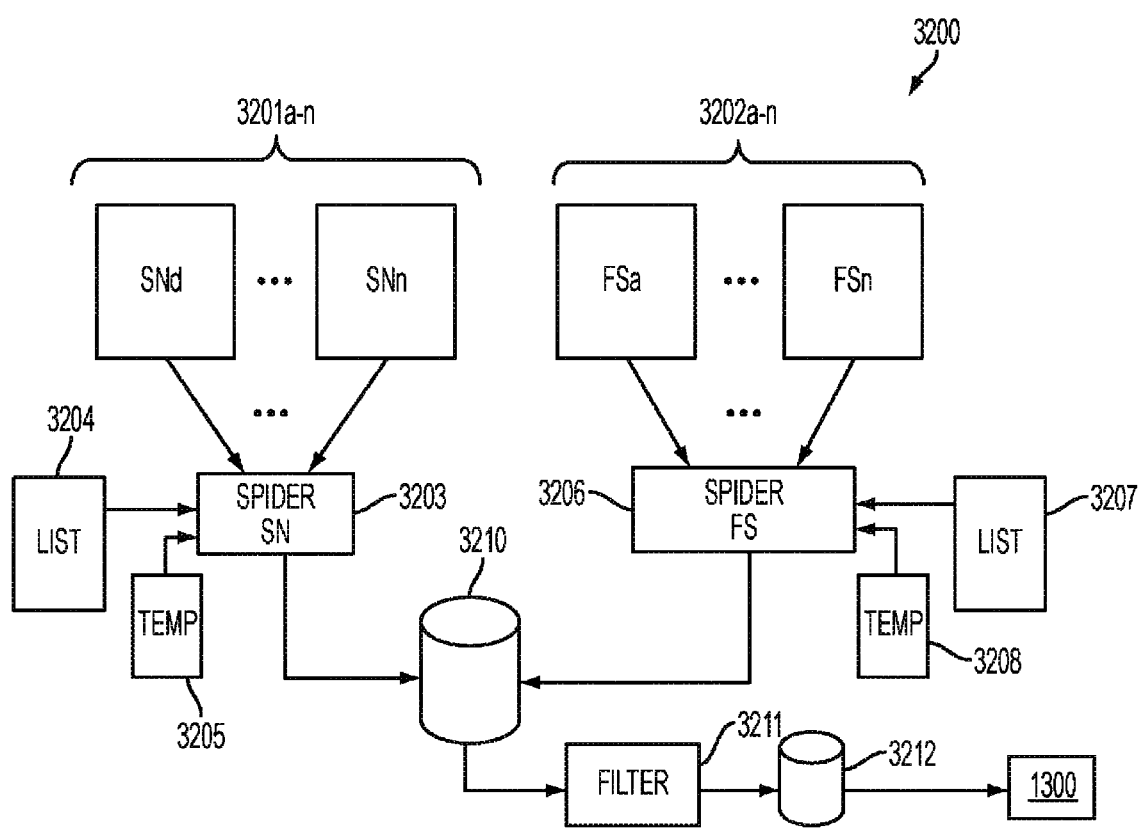
FIG. 32 shows an overview of a system for identifying software-created problems and operational disruptions in smart phone computing devices and other mobile computing devices with cellular connections.

FIG. 32 shows an overview of a system 3200 for identifying software-created problems and operational disruptions in smart phone computing devices and other mobile computing devices with cellular connections, such as, for example, tablets, etc., according to one aspect of the system and method disclosed herein. However, mobile devices with any type of data connection (cellular, WiFi, Bluetooth or other wireless communications) should be considered possible devices upon which to use the systems and methods described herein.

The system comprises social networking sites SNa-SNn 3201a-n and technical forum sites FSa-FSn 3202a-n, all of which sites may be searched by a type of web-site scanning software known in the art as a "spider." In this example, two different spiders SN 3203 and FN 3206 search the two types of sites 3201a-n and 3202a-n, respectively, because each spider has been optimized to search its respective type of site. Thus spider 3203 is optimized to search social networking sites 3201a-n, which sites may include, but are not limited to, such social networking sites as Facebook, Twitter, MySpace, LinkedIn, etc. Similarly, spider 3206 is optimized to search technical forum sites. Spider 3203 has a list 3204 of sites to visit and a list of templates 3205, each template being designed for a particular site or site subset to optimize the extraction of data from each site. Extracted data is then stored in data store 3210. Similarly, spiders 3206 and 3209, which may be copies of essentially the same software running in different specialized configurations, or may be completely different versions, use site list 3207 and template set 3208, respectively. Both the list and the template set may be amended as needed over time, typically manually, although automatic amending of their data in whole or in part is contemplated within the scope of this invention. When data is collected in data store 3210, the system applies a filter 3211, which filter removes irrelevant data and organizes the relevant data by such criteria as phone make, model number, etc., creating a list of harmful combinations of model IDs, OS versions, and other device characteristics that in conjunction with one or more programs negatively impact the user experience. The organized data is then stored in data store 3212. In an embodiment, the system then can sort the data into types of faults and problems and try to identify software that users blame for operating faults and unsafe operations.

Figure 33:
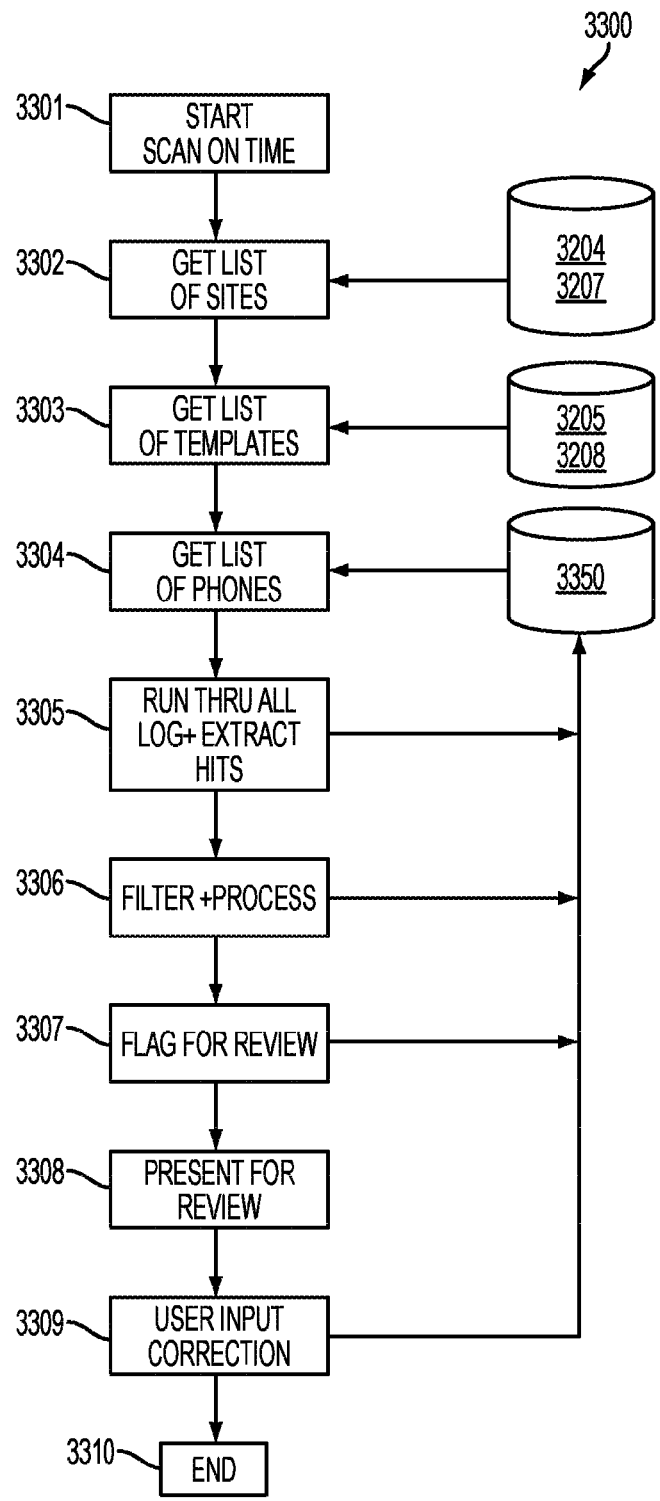
FIG. 33 shows an exemplary process for data retrieval and analysis by system software running on a computer or server.

FIG. 33 shows an exemplary process 3300 for data retrieval and analysis by system software running on a computer or server, as described above and throughout, according to one aspect of the system and method disclosed herein. In step 3301 the system starts the scanning at a specified time. In some cases, the system may continually be scanning web sites; in other cases, the system may scan at preset intervals such as, for example, once a day, once a week, at particular times, or upon the occurrence of a particular event. Some web sites have rules about the specific number, size, and/or frequency of visits or downloads allowed to site scanning software or so-called robots, and these are typically specified in a robots.txt file at the root directory of a site or subsection. Such site-specific rules are recorded in templates 3205 and 3208. In step 3302, the system retrieves its lists 3204 and/or 3207 of sites to scan, and in step 3303 it applies the templates 3205 and/or 3208 to the listed sites.

With continued reference to FIG. 33, in step 3304, the system retrieves from data store 3350 a list of phones for which it should particularly look on the object sites. In an embodiment, this list is user-generated or based on error reports found at a scanning site, where incoming suspect devices are scanned for trouble. Further, in some cases, the list may be manually extended based on inquiries from field support, for example in stores, as well from reports in call centers, etc. The list may be updated whenever required automatically as reports about phones that are not yet listed as having problems reach a certain level or frequency, or manually when suggestions to add certain phones are made to the system operators. In step 3305 the system reads all the scan logs and extracts all the hits. In step 3306 the system applies filters, such as filter 3311. Various types of filtering criteria may apply; for example, responses that don't identify the problem phone specifically enough or snide comments and other inappropriate language may be removed. In step 3307 the system flags elements of interest for review. If the issue is clearly of interest (above a certain relevancy level) the system may book it directly. If the relevancy level is not high enough, but above a predetermined relevancy level so as to be of potential interest, in step 3308 the system presents the issue to a technician or other suitable person for manual review. In step 3309 the system operators review and resolve the presented issues, and in the 3310 the process ends, to begin again either immediately or as scheduled.

Figure 34:
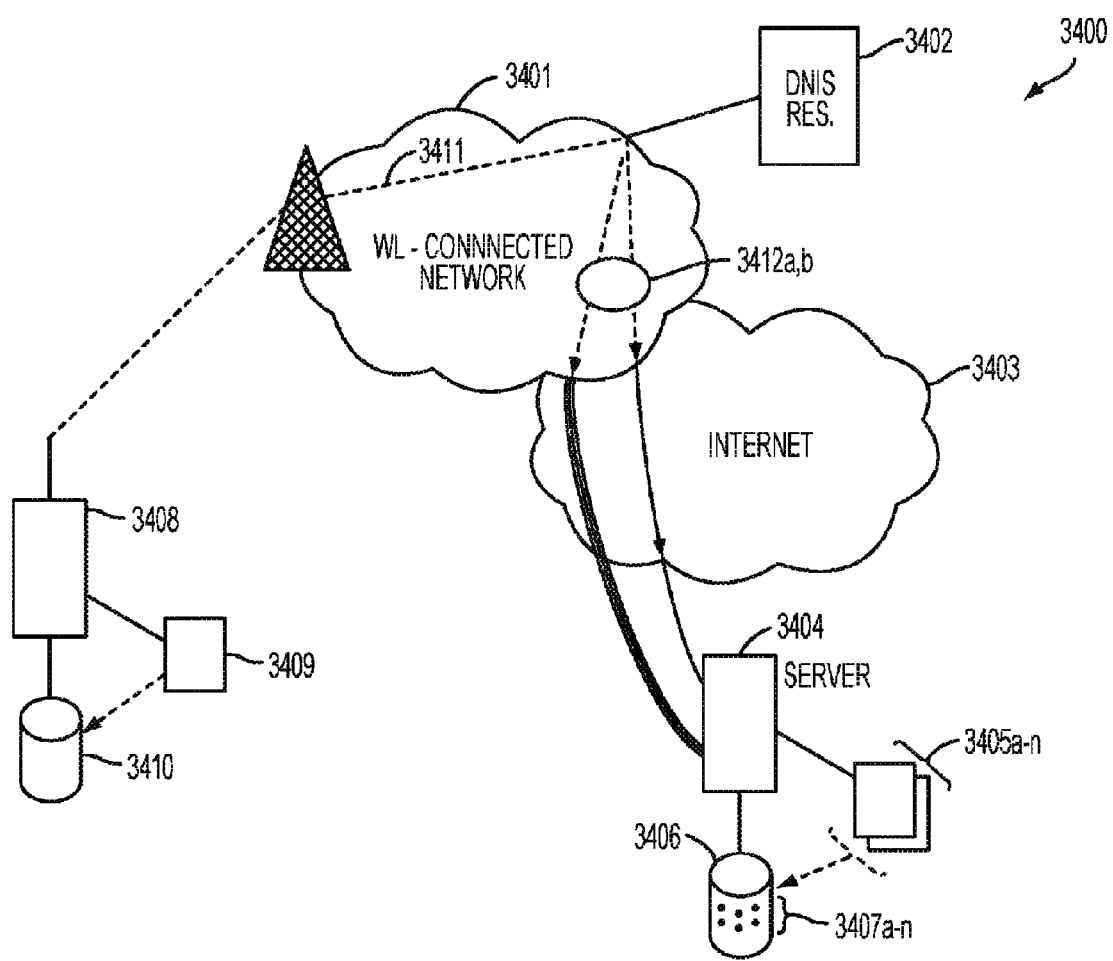
FIG. 34 shows an overview of an exemplary system for reprogramming phones.

FIG. 34 shows an overview of a system 3400 for reprogramming phones according to one aspect of the system and method disclosed herein. A mobile computing device or smartphone 3408 initially contains standard code 3409 and a storage 3410, such as, for example, a micro SD card. Device 3408 is connected to a network 3401 of a carrier. Typically, the phones can be activated by users by dialing a USSD (unstructured supplementary services data) number (or sequence) and entering some codes accordingly. Typically, a single USSD number connects to the carrier's activation number, and then once the connection is established, the USSD essentially establishes a two-way data connection, similar to a USB connection, over the air, enabling the phone to be reprogrammed under control of a server. Because the USSD number is entered like a number, it often is redirected by a DNIS (Dialed Number Identification Service) server, which resolves the destination number, for instance, server 3402, and then redirected to the USSD server. By using a specially for the purpose described herein setup, nonstandard USSD number or a nonstandard phone number, the initial dialed call or connection can be redirected to an external server such as 3404. That server contains multiple software applications, including an operating system, such as 3405*a-n*, and other programs as described herein. Further, storage 3406 also contains objects 3407*a-n*, where the objects are pieces and complete assemblies for over-the-air (OTA) programming of phones, as discussed throughout and later.

Figure 35:
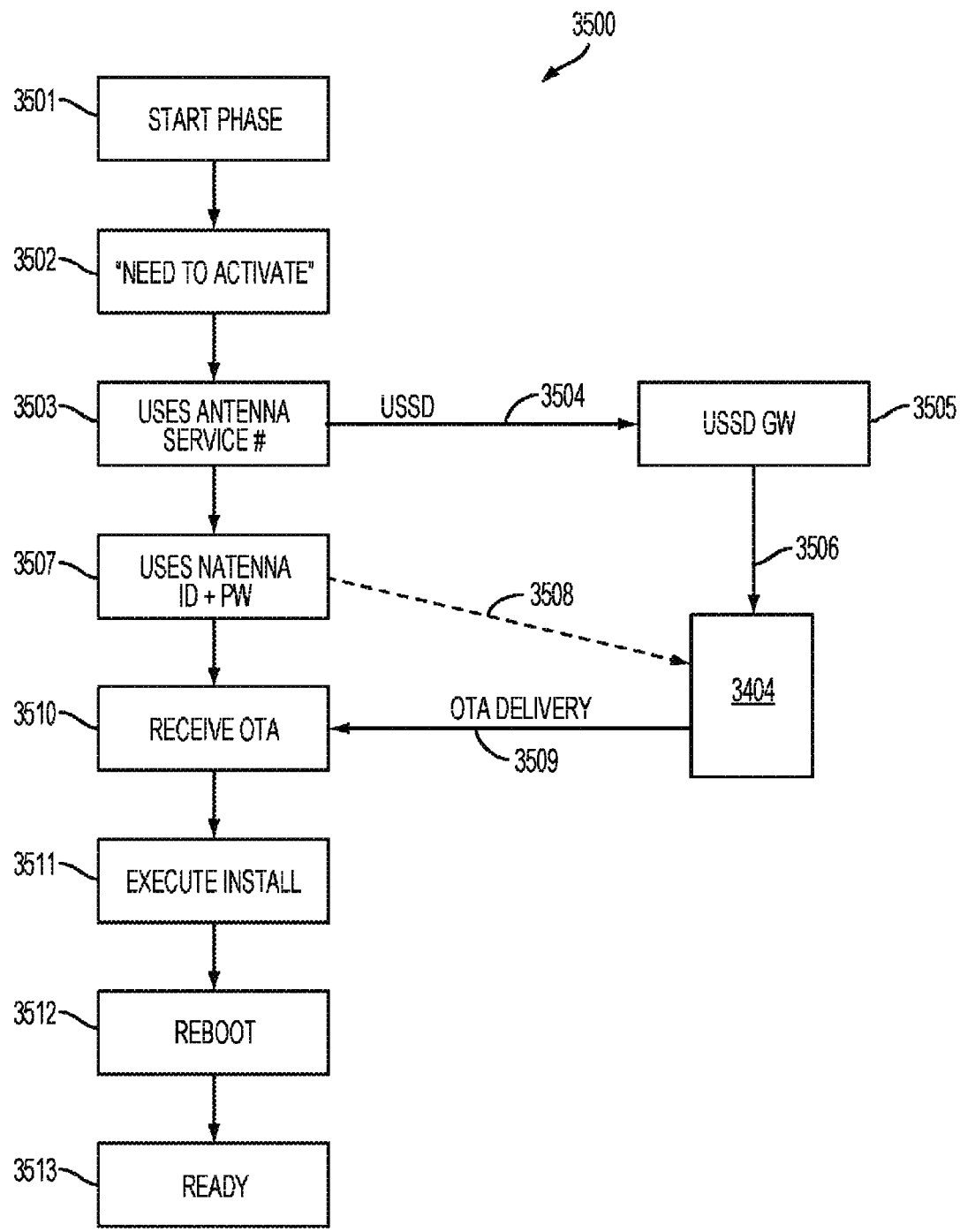
FIG. 35 shows an exemplary process for programming any one of multiple phones.

FIG. 35 shows an exemplary process 3500 for programming any one of multiple phones, according to one aspect of the system and method disclosed herein. In step 3501, a phone is turned on, and in step 3502, a "need to activate" message appears on the phone display. In step 3503 a user, who may be a technician or even an end user to whom a particular phone is or was assigned, further discussed herein, enters the special service number, which number may be, for example, a USSD number or a special phone number for activating the phone. By calling the number, an activation request is sent via transmission 3504 to USSD gateway 3505 for treatment. USSD gateway 3505 typically may be part of the cellular network DNIS server, such as server 3402 (not shown here). In some cases, USSD gateway 3505 may be a separate server, depending on the configuration of the carrier. The transferred request is then redirected via transmission 3506 to server 3404, which contains the OTA images, further discussed herein. In step 3507, the system prompts the user to enter an ID that contains the enterprise customer ID, the user ID, and/or the password. This data is sent via connection 3508, where the connection is typically as USSD type of connection, to server 3404. Server 3404 then delivers, via transmission 3509, the OTA image or package. In step 3510, the phone receives the OTA package (also referred to as a software module), where the package or module is typically a standard part of the basic phone setup. In step 3511, the package installation is executed. The type of installation may vary: it may be a simple overwrite of the ROM programming, or it may be a multi-step process that requires more than one reboot of the phone software. In one embodiment, this process continues largely unattended because the package may be put into the storage device of the phone (such as an SD card or other storage device commonly used in such phones), so that the phone may reboot several times without requiring user interaction. In step 3512, the phone is finally reprogrammed, having rebooted as many times as required, and in step 3513, the phone is ready for use. It is now programmed for its user, with password, account, etc., all preconfigured. The account may include setups for email, control, internal extensions and other customer phone book entries, and other, similar account data.

Figure 36:
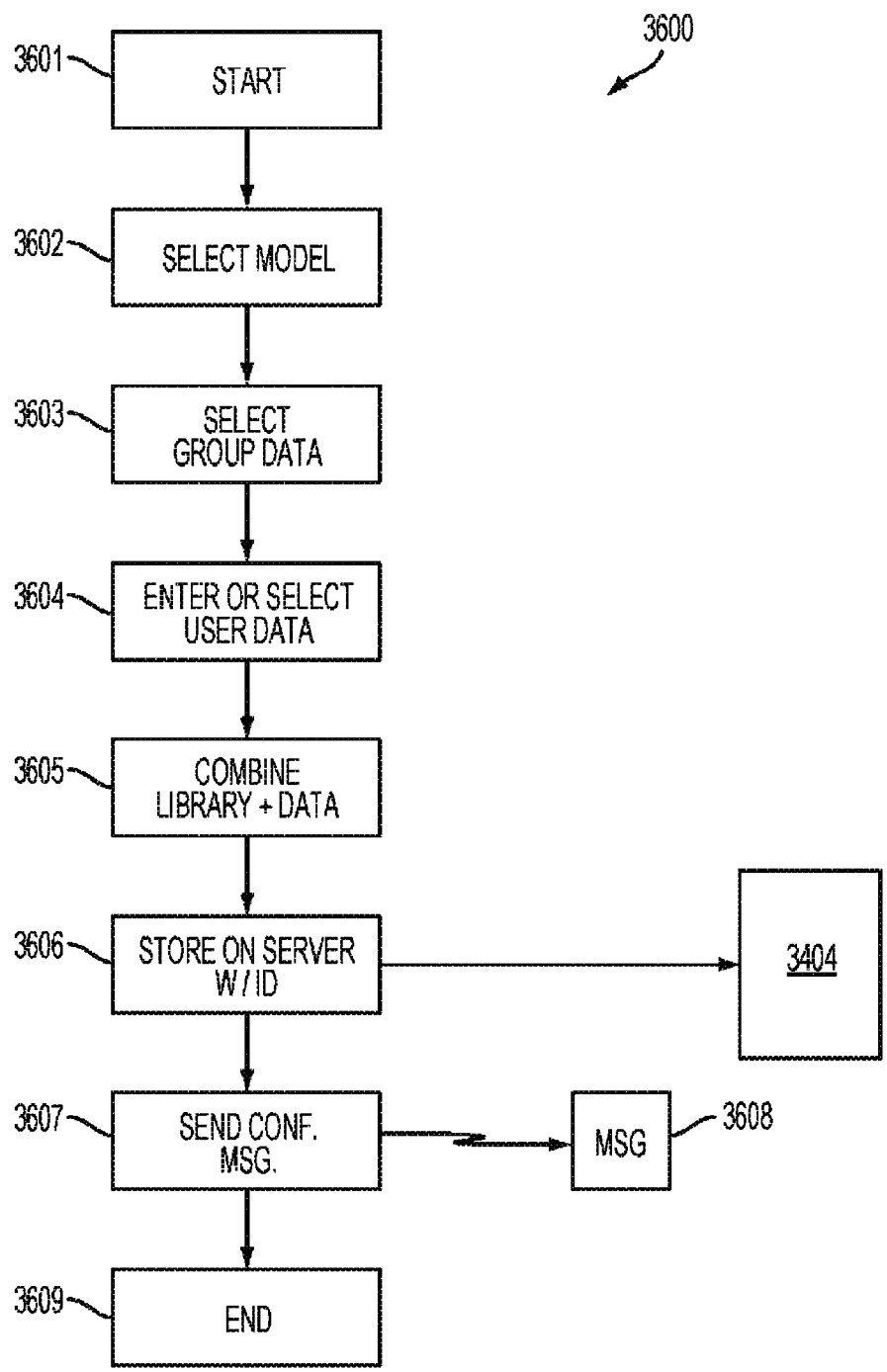
FIG. 36 shows an exemplary process for creating a phone reprogramming package.

FIG. 36 shows an exemplary process 3600 for creating an OTA phone reprogramming package, according to one aspect of the system and method disclosed herein. Process 3600 may be applied to a single phone, multiple phones in one enterprise, or even multiple phones of multiple enterprises. In step 3601, the system is started. In step 3602, a user or technician selects a phone model. In step 3603, the programmer selects group data, which may include any data to be programmed on all the target phones of a group. Typically, such data, for an enterprise customer, could include an IP PBX extension for the enterprise, so the phone is an extension of the IP PBX. Such programming may require installation of additional software, as well as certificates or other credentials to access the particular phone switch. In step 3604, user data is either entered or selected. Individual user data could, for example, be provided by the technician to that package, often in a table or spreadsheet format that is automatically processed and then applied to the data on a one-package-at-a-time basis for the whole list or table. In step 3605, for each phone, a combination package is created, where the package contains one or more of the group data, the individual user data, the carrier data, and any other libraries or additional information needed or desired. In step 3606, that package is stored, with its credentials, in the storage unit of server 3404. This data in the tables or spreadsheets and thus the package with credentials now includes the ID and password described previously in the description of step 3507 of FIG. 35. The ID and password are used to identify and to secure access to the package. In step 3607, one or multiple messages, such as, for example, message 3608, are sent to a technician who is charged with delivering or setting up the phones. The technician or phone user would then execute the process described in the discussion of FIG. 35 above. After delivery of the message, the process ends in step 3609. Both the package described above, in the discussion of FIG. 36, and part of the program likewise described previously in the discussion of FIG. 35 are stored on server 3404 as part of the software mentioned in the discussion of FIG. 34, as programs 3505-x1 through 3505-x2, within the range a-n.

Figure 37:
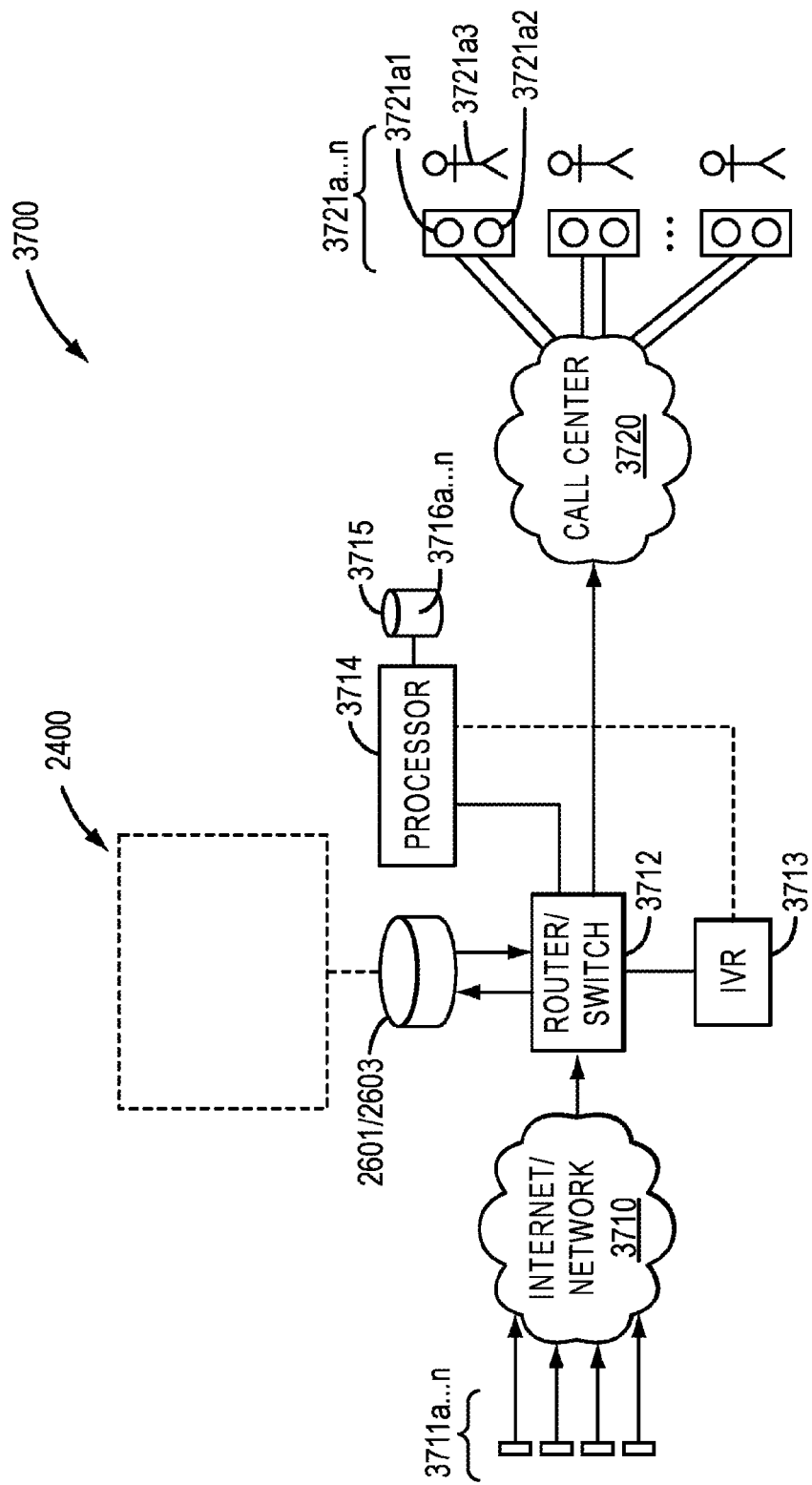
FIG. 37 shows an exemplary overview of a system for routing calls according to one embodiment.

FIG. 37 shows an exemplary overview of a system 3700 for routing calls according to one embodiment of the system and method disclosed herein, and based on an automatic diagnosis performed as described earlier. Also, see diagnosis as described in U.S. Patent Application Publication No. 2012/0322439, published Dec. 20, 2012, entitled "SYSTEM AND METHOD FOR ENHANCED DIAGNOSTICS ON MOBILE COMMUNICATION DEVICES," by Ding et al., the entire contents of which application is incorporated by reference as if fully set forth herein.

Diagnostic system 2400 was discussed in more detail earlier above, in and around the description of FIG. 24 and in other related parts, and databases 2601 and 2603 contain the results of the data collected by system 2400 (and in some embodiments, data collected as elsewhere described herein). Now, if a user calls, for example, from any of devices 3711a-n through an Internet and/or phone network connection 3710, such as a standard telephone network, the user is connected with router/switch 3712 that can route various sorts of phone calls and combinations of phone calls, such as, for example, analog phone calls, wireless phone calls, IP phone calls, and other, similar phone calls.

Router/switch 3712 is controlled by processor 3714, which has storage 3715 and programs 3716a-n, some of which are discussed further below. Also present, but not shown for reasons of clarity and simplicity, is a variety of interfaces to couple said router to all networks required to perform its tasks, memory to execute code for programs, an operating system, etc., as well as input and output devices, etc.

Programs 3716a-n may include such software instances as an operating system, drivers, etc., as may be necessary to control the router/switch. Interactive voice response (IVR) software 3713 may be controlled directly by processor 3714 or through router/switch 3712. When calls arrive, they are processed and then routed to call center 3720. There are many different call center topologies, but for purposes of clarity and simplicity in this discussion, any and all call center types may be used and are shown here in representative fashion as exemplary cloud 3720. Call center stations 3721a-n each typically have a workstation with communication and data display devices 3721a1 and 3721a2, and an agent 3721a3.

Figure 38:
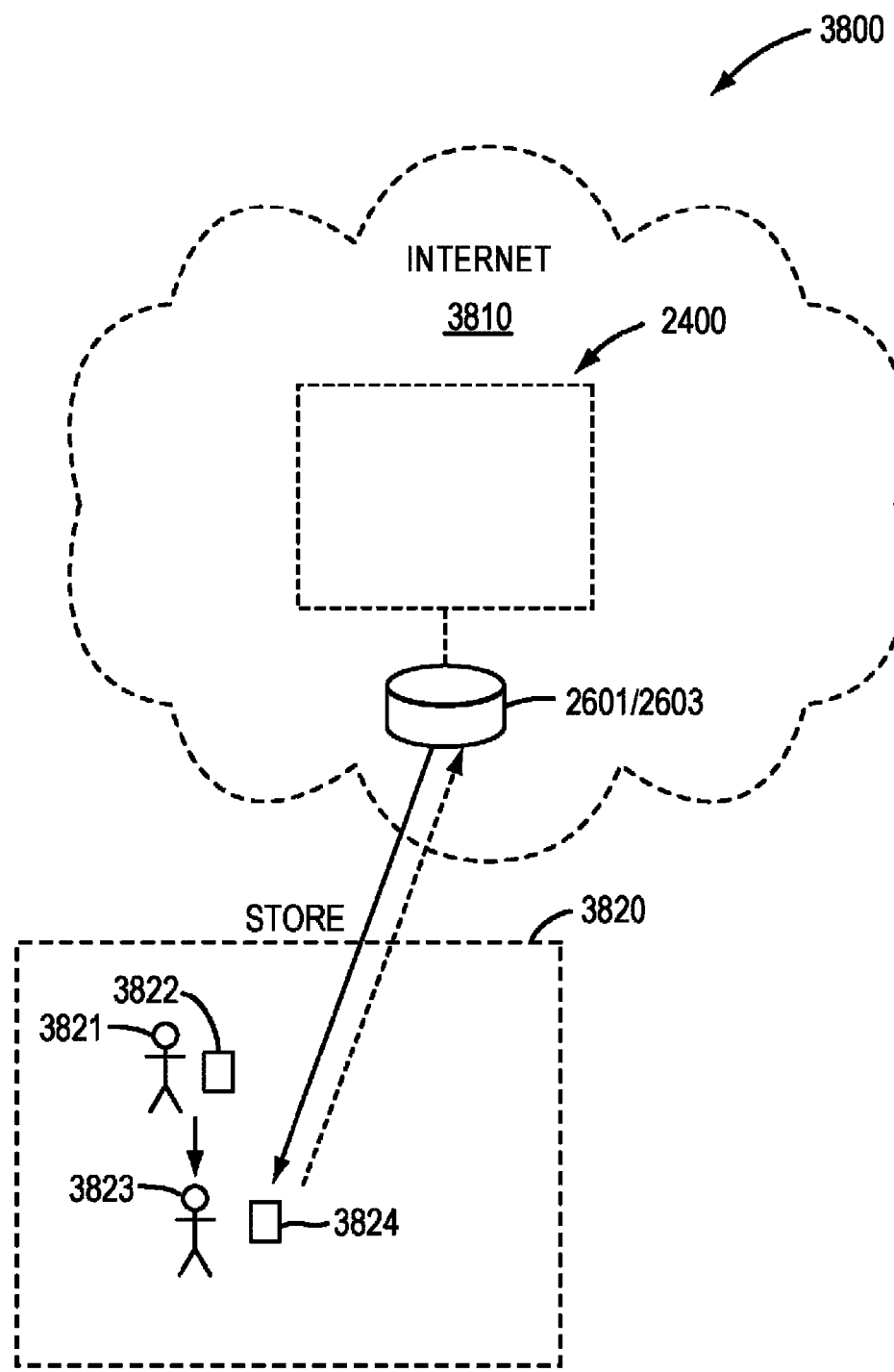
FIG. 38 shows an overview as an example of use of the system and method disclosed herein according to one embodiment, wherein a customer with a device goes to a customer service location.

FIG. 38 shows an exemplary overview 3800 as an example of use of the system and method disclosed herein, wherein a customer 3821 with a device 3822 goes to a customer service location 3820, such as, for example, a store. Said customer may speak to a store agent 3823, who may use a station 3824, which station may be any of a large variety of devices, such as, for example, a kiosk, a pad, a workstation, or any other such device.

Alternatively, station 3824 may be designed so that the customer can use the station by herself or himself, without help from any agent 3823, in a manner similar to self-service at, for example, an airport self-check-in station or a grocery self-service check stand. Such an approach may enable one agent 3823 to assist multiple customers, for example, five or even ten customers, at any one time. Station 3824 may typically be a complete computer with its own processor, local storage, memory, input/output subsystem, communication interfaces, etc., said interfaces coupled to a network, so station 3824 can access diagnostic system 2400 and access information stored on databases 2601 and 2603, looking up information for the customer's device 3822 and then delivering remedies.

Figure 39:
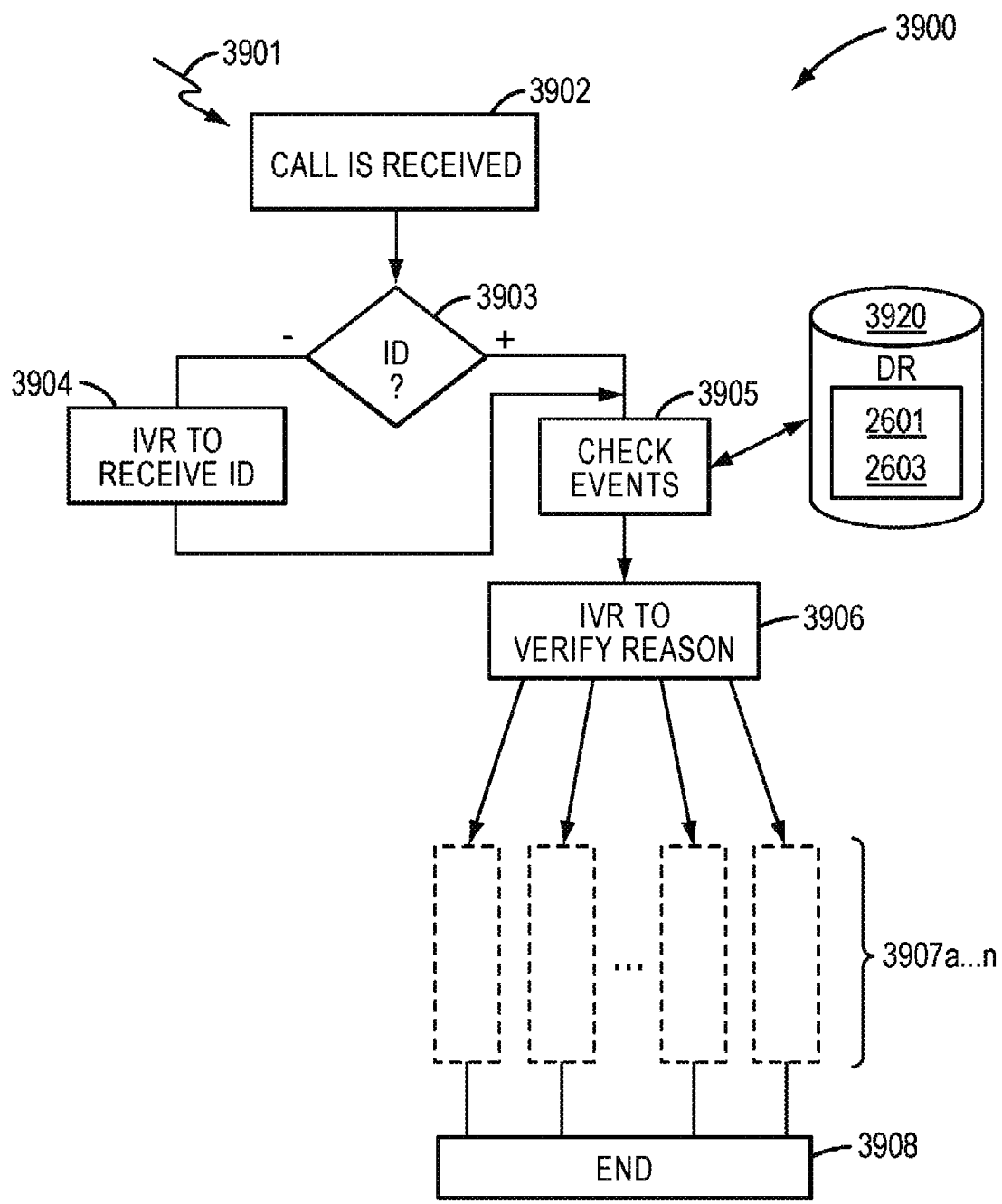
FIG. 39 shows an exemplary process for diagnostic services at a call center, according to one embodiment.

FIG. 39 shows an exemplary process 3900 for diagnostic services at a call center, according to one embodiment of the system and method disclosed herein. Incoming call 3901 is received in step 3902. In step 3903 the system checks for some form of customer identification. If the system does not detect any ID (−), the call is routed in step 3904 to the IVR system 3713, which queries the customer or the device itself for some identification, such as a phone number, an account number, etc.

Upon receiving some form of ID in step 3904, or if the system receives an ID (+) in step 3903, the process moves to step 3905, where the system checks with main data repository 3920, or it may also pull from repositories 2601 and 2603, the event history of the device.

In step 3906 the IVR offers any solution or solutions, based on information about the problem found and identified in the data repositories, or it may connect the caller to a specialist to help resolve the issue. Because each and all problems may have many different possible solutions or outcomes, they are all exemplarily shown as sections 3907a-n, each of which may have multiple steps. At the end of all steps 3907a-n, the call ends in step 3908. Step 3908 may also include a quality and satisfaction survey offered to the caller at the end of the call.

Figure 40:
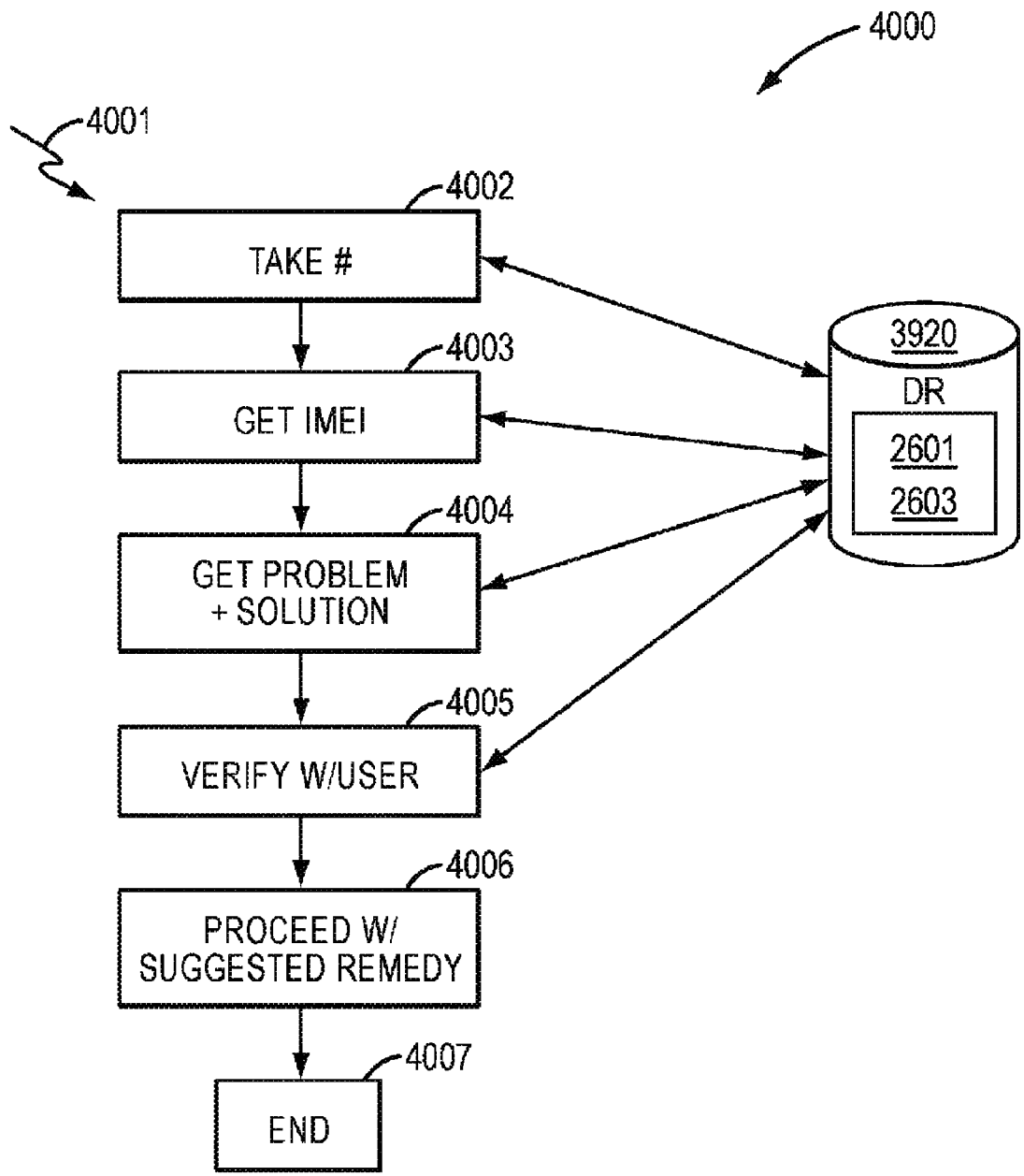
FIG. 40 shows an exemplary process for customer service at a telephone diagnostic location, according to one embodiment.

FIG. 40 shows an exemplary process 4000 for customer service at a telephone diagnostic location, according to one embodiment of the system and method disclosed herein. Customer 4001 enters the location, and in step 4002, customer identity is determined, typically by his or her phone number, either by a service agent or technician 3823, or by the customer entering information at a self-service station 3824, as described above in the discussion of FIG. 38. The phone number is transmitted to data repository 3920 and/or databases 2601 and 2603.

In step 4003, the phone number is used to retrieve the international mobile equipment identity (IMEI) of the phone. In step 4004, the IMEI number is used to retrieve problem solutions, based on known problems of identical or very similar phones. In step 4005, the system verifies with the user that the problem retrieved from the database is indeed the problem the user identifies. In step 4006, the system instructs the user to implement the solution(s) for the identified problem or calls an agent for help, in cases such as, for example, where the device needs to be exchanged. Step 4006 may involve one or more of many various solutions, based on the verified problem. In step 4007, the process ends.

It is clear that many modifications and variations of the system and method disclosed herein may be made by one skilled in the art without departing from the spirit of the novel art of this disclosure.

In some cases, a system may be able to discover faulty conditions due to software incompatibilities of software installed in smart phone computing devices that have a process for recording what applications are launched or installed, by creating a list of potentially problematic interactions by analyzing what application was launched or installed just prior to a crash or other operational problem. However, any problems between applications and operating system, driver, hardware or in combination with other apps, or any combination thereof due to software incompatibilities of hardware or of software installed in said mobile computing device may be observed and recorded.

In one embodiment, the recordings are stored in a memory on the smart phone computing device in a fail safe fashion, and/or on a storage accessed over a network. A process running on one of the networked devices may read the recordings and analyze them to obtain statistical or heuristic patterns pinpointing a program that is creating the problems. A list or database is created that lists harmful combinations of model IDs, OS versions, and other device characteristics that, in conjunction with one or more programs, negatively impact the user experience. This list or database may be used to warn a user when he or she tries to download a program included in the list or database. A computer may be connected to the Internet, containing a program for collecting data on the Internet, by spidering or scanning websites, including but not limited to social network sites and forums for smart phone discussions. Further, the list may be used to focus on specific programs, device characteristics or models of smart phone computing devices to focus the spidering on those items. Further, said collected data may be analyzed using various methods, including but not limited to pattern identification, statistical analysis, heuristic analysis, AI analysis, table look-up, etc., each separately or in various combinations or sequences to obtain actionable items to either escalate to a technician in cases of no known solutions, or dispatching a solution in cases of known solutions, said solutions including but not limited to machine executable instructions sent to the device for local resolution, as well as instruction to a user for manual step-by-step resolution, both separately and or in combination.

Additionally, in various embodiments the servers described in the discussions of FIGS. 34, 35, and 36 may be cloud-based rather than physical servers in a specific facility. Also, rather than installing a special OTA package, the package could be pulled together via a cloud interface installed on a target phone, with the particular components of the package selected and installed based on a particular ID.

Additional various non-limiting embodiments are now presented below. In a first embodiment, a system comprises: at least one processor; and memory storing instructions configured to instruct the at least one processor to: receive an incoming call from a device of a customer; check for an identification of the customer; obtain, from a data repository, an event history of the device; and facilitate providing a solution to the customer using the event history.

In another embodiment, the system further comprises an interactive voice response system to receive the incoming call. In one embodiment, the device is a phone, the identification is a phone number, and the instructions are further configured to instruct the at least one processor to retrieve a mobile equipment identity of the phone.

In one embodiment, the event history comprises known problems and/or circumstances of devices that are identical or similar to the device of the customer. For example, based on these known problems, known solutions to the problems can be offered. In one embodiment, the instructions are further configured to instruct the at least one processor to, if the identification is not detected from the incoming call, query the device or the customer for the identification.

In one embodiment, the system further comprises a call center, wherein the instructions are further configured to instruct the at least one processor to route the incoming call to the call center.

In another embodiment, a method includes: receiving, by a server computer, a code from a mobile computing device of a user, wherein the code is received over a data connection (e.g., either wired or wireless); and in response to receiving the code, calculating, by the server computer, at least one set of data for use in guiding a request of a customer for service to a resource that can provide a suggested remedy. In one example, the code is received before activation of the mobile computing device. In other examples, the code may be received during or after activation of the mobile computing device. In some cases an IMEI number is used for identifying a device. In some cases an ESN is used, or any other suitable ID that can be made available, including but not limited to an existing or new phone number, home address, SSN, email address, etc. These methods of identifying a specific device are not limited to use in pre-activation, but can be used analogously throughout.

In one embodiment, the request is for assistance from a specialist, and the method further comprises transferring, based on the calculated data, the customer to the specialist. In one embodiment, the method further comprises directing the customer to a resource that enables the customer to address a problem with the mobile computing device via self-help. In one embodiment, the method further comprises receiving the request when the customer is appearing at a physical location, and directing the customer to a local resource using a phone number of the customer.

In one embodiment, the local resource is a kiosk device configured to connect to a phone of the customer wirelessly (using existing wireless protocols, both LAN and WAN types, as well as potentially other methods, including but not limited to IR communication, sound communication, "bumping", etc.) or by wire. In one embodiment, the local resource is a live customer support representative, who is presented with an indication or information about a further resource (e.g., a person) to which the customer can be directed for further help.

In one embodiment, the method further comprises, all performed by a local network: identifying the customer, displaying a greeting for the customer on a local monitor or device, and directing the customer to a local resource. In one embodiment, the method further comprises providing, by the local resource, a queue in which the customer waits for a local or remote specialist to provide assistance.

In yet another embodiment, a non-transitory computer readable storage medium stores computer program instructions capable of being executed by a computer processor, the computer program instructions defining: identifying, by a server computer, a user associated with a mobile computing device (e.g., before or after the user activates the mobile computing device); determining, by the server computer, an event history of the mobile computing device; and providing, to the user, guidance to resolve an issue associated with the mobile computing device based on the event history.

In one embodiment, the computer program instructions further define receiving an incoming call from the mobile computing device. In one embodiment, the identifying further comprises determining a phone number or account number (or other identifying information) associated with the user. In one embodiment, the identifying further comprises determining an international mobile equipment identity (or other identifying information) of the mobile computing device.

In one embodiment, the providing guidance further comprises retrieving problem solutions based on known problems of identical or similar mobile computing devices. In another embodiment, the providing guidance further comprises instructing the user to implement a problem solution of a plurality of problem solutions. In yet another embodiment, the providing guidance further comprises calling an agent for help.

For problem-solving, in one embodiment a server may receive a code from a phone over a wireless connection before the user activates the phone. In response, the server may guide customer requests for service to an appropriate resource. If the customer requests help from a specialist, the customer may be transferred directly to a specialist group. In other cases, the customer may be directed to a self-help resource where he can address the problem by himself. In some cases, the customer may go to a service location, where his phone number may be used to direct him to a local resource. At the service location, a local network may identify the customer, display a greeting on a video output device, and direct the customer to a local resource. The local resource may be a kiosk device connecting to the customer's phone either by wire or wirelessly, or it may be a queue for a local or remote specialist.

These modifications and variations do not depart from its broader spirit and scope, and the examples cited herein are to be regarded in an illustrative rather than a restrictive sense.

We claim:

1. A system, comprising:
   at least one processor; and
   memory storing instructions configured to instruct the at least one processor to:
   determine an identity of a computing device of a user;
   determine an event history for the computing device, wherein the event history comprises installation of applications on the computing device;
   retrieve, from a data repository, using the identity and the event history, a solution based on known problems of other computing devices; and
   based on the solution, send machine executable instructions to the computing device for local resolution.

2. The system of claim 1, wherein the instructions are further configured to instruct the at least one processor to receive an incoming call from the user, wherein the identity is determined based on a phone number associated with the incoming call.

3. The system of claim 2, wherein the identity is an equipment identity of a phone.

4. The system of claim 1, wherein the instructions are further configured to instruct the at least one processor to verify with the user that the solution corresponds to a problem identified by the user.

5. The system of claim 1, wherein the event history is recorded in a storage accessed by the at least one processor over a network.

6. The system of claim 1, wherein the instructions are further configured to instruct the at least one processor to analyze the event history to determine patterns to identify software that is causing a problem on the computing device.

7. A method, comprising:
   determining, by a server computer, an identity of a computing device of a user;
   determining, by the server computer, an event history for the computing device, wherein the event history comprises installation of applications on the computing device;
   retrieving, by the server computer from a data repository, using the identity and the event history, a solution based on known problems of other computing devices; and
   based on the solution, sending machine executable instructions to the computing device for local resolution.

8. The method of claim 7, further comprising updating the data repository using data collected from websites, the data comprising device characteristics of computing devices.

9. The method of claim 8, further comprising analyzing the collected data using pattern identification.

10. The method of claim 7, wherein the event history further comprises problems of computing devices that are identical or similar to the computing device of the user.

11. The method of claim 7, further comprising providing instructions to the user regarding implementing the solution.

12. The method of claim 7, further comprising receiving an incoming call from the computing device, wherein the identity is determined from the incoming call.

13. A non-transitory computer readable storage medium, storing computer program instructions capable of being executed by a computer processor, the computer program instructions defining:
   determining an identity of a computing device of a user;
   determining an event history for the computing device, wherein the event history comprises installation of applications on the computing device;
   retrieving, from a data repository, using the identity and the event history, a solution based on problems of other computing devices; and
   based on the solution, sending machine executable instructions to the computing device for local resolution.

14. The non-transitory computer readable storage medium of claim 13, wherein the computing device is a phone, and the identity is a mobile equipment identity of the phone.

15. The non-transitory computer readable storage medium of claim 13, wherein the computer program instructions further define analyzing the event history to determine patterns for identifying software causing a problem on the computing device.

16. The non-transitory computer readable storage medium of claim 13, wherein the computer program instructions further define updating the data repository using data collected from websites, the data comprising device characteristics of computing devices.

17. The non-transitory computer readable storage medium of claim 13, wherein the event history further comprises problems of computing devices that are identical or similar to the computing device of the user.

18. The non-transitory computer readable storage medium of claim 13, wherein the computer program instructions further define verifying with the user that the solution corresponds to a problem identified by the user.

19. The non-transitory computer readable storage medium of claim 18, wherein the computer program instructions further define providing instructions to the user regarding implementing the solution.

* * * * *